United States Patent
Kaji et al.

(10) Patent No.: US 9,630,283 B2
(45) Date of Patent: Apr. 25, 2017

(54) CLAMP DEVICE

(71) Applicant: KOSMEK LTD, Hyogo (JP)

(72) Inventors: Kenta Kaji, Hyogo (JP); Gaku Yoshimura, Hyogo (JP); Kohei Yamamoto, Hyogo (JP)

(73) Assignee: KOSMEK LTD., Hyogo (JP)

( * ) Notice: Subject to any disclaimer, the term of this patent is extended or adjusted under 35 U.S.C. 154(b) by 103 days.

(21) Appl. No.: 14/406,295

(22) PCT Filed: May 31, 2013

(86) PCT No.: PCT/JP2013/065182
§ 371 (c)(1),
(2) Date: Dec. 8, 2014

(87) PCT Pub. No.: WO2014/002684
PCT Pub. Date: Jan. 3, 2014

(65) Prior Publication Data
US 2015/0165575 A1     Jun. 18, 2015

(30) Foreign Application Priority Data

Jun. 28, 2012  (JP) ................................. 2012-159032

(51) Int. Cl.
*B23Q 3/08*     (2006.01)
*B23Q 1/00*     (2006.01)

(52) U.S. Cl.
CPC ............... *B23Q 1/009* (2013.01); *B23Q 3/08* (2013.01)

(58) Field of Classification Search
CPC .................................. B23Q 1/009; B23Q 3/08
See application file for complete search history.

(56) References Cited

U.S. PATENT DOCUMENTS

2010/0320664 A1* 12/2010 Kawakami ............. B23Q 3/082
                                                                 269/32
2010/0327503 A1   12/2010 Kawakami
                        (Continued)

FOREIGN PATENT DOCUMENTS

DE      4020981      1/1992
EP      2327507      6/2011
              (Continued)

OTHER PUBLICATIONS

International Search Report for PCT/JP2013/065182 dated Jul. 2, 2013.
(Continued)

*Primary Examiner* — Larry E Waggle, Jr.
*Assistant Examiner* — Nirvana Deonauth
(74) *Attorney, Agent, or Firm* — Bacon & Thomas, PLLC

(57) ABSTRACT

A plurality of engagement members (20), inserted in a hole in an object to be fixed, which are capable of gripping an inner circumferential surface of the hole are provided, and a wedge face (32) of a clamping rod (15) is engaged on an inner circumference of the engagement member (20) from an upper side. An upper part of a piston rod (55) protruding upward from a piston body (54) of a piston (12) is coupled to a lower part of the clamping rod (15). The engagement member (20), the clamping rod (15), and the piston (12) are provided in a housing (2). An annular valve member (78) is provided between the housing (2) and the piston rod (55). When the piston (12) has moved to a lower-limit region in a lock direction, an actuating portion (89) of the piston rod (55) causes the valve member (78) via an actuated portion (99) of the valve member (78) to be opened downward.

11 Claims, 20 Drawing Sheets

(56) References Cited

U.S. PATENT DOCUMENTS

2011/0133381 A1   6/2011  Kawakami
2013/0042443 A1   2/2013  Kawakami

FOREIGN PATENT DOCUMENTS

| JP | 4297511    | 7/2009  |
| JP | 201036314  | 2/2010  |
| JP | 201111288  | 1/2011  |
| JP | 2011235384 | 11/2011 |

OTHER PUBLICATIONS

International Preliminary Report on Patentability of PCT/JP2013/065182 with English translation dated Dec. 31, 2014.
European Search Report for 13810102.7 dated Nov. 6, 2015.
Office Action for corresponding application CN 201380034423.9 dated Dec. 29, 2015 and English translation.
Office Action for corresponding application CN 201380034423.9 dated Dec. 29, 2015.

* cited by examiner

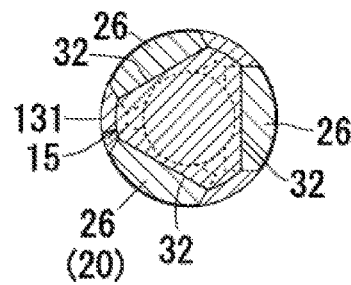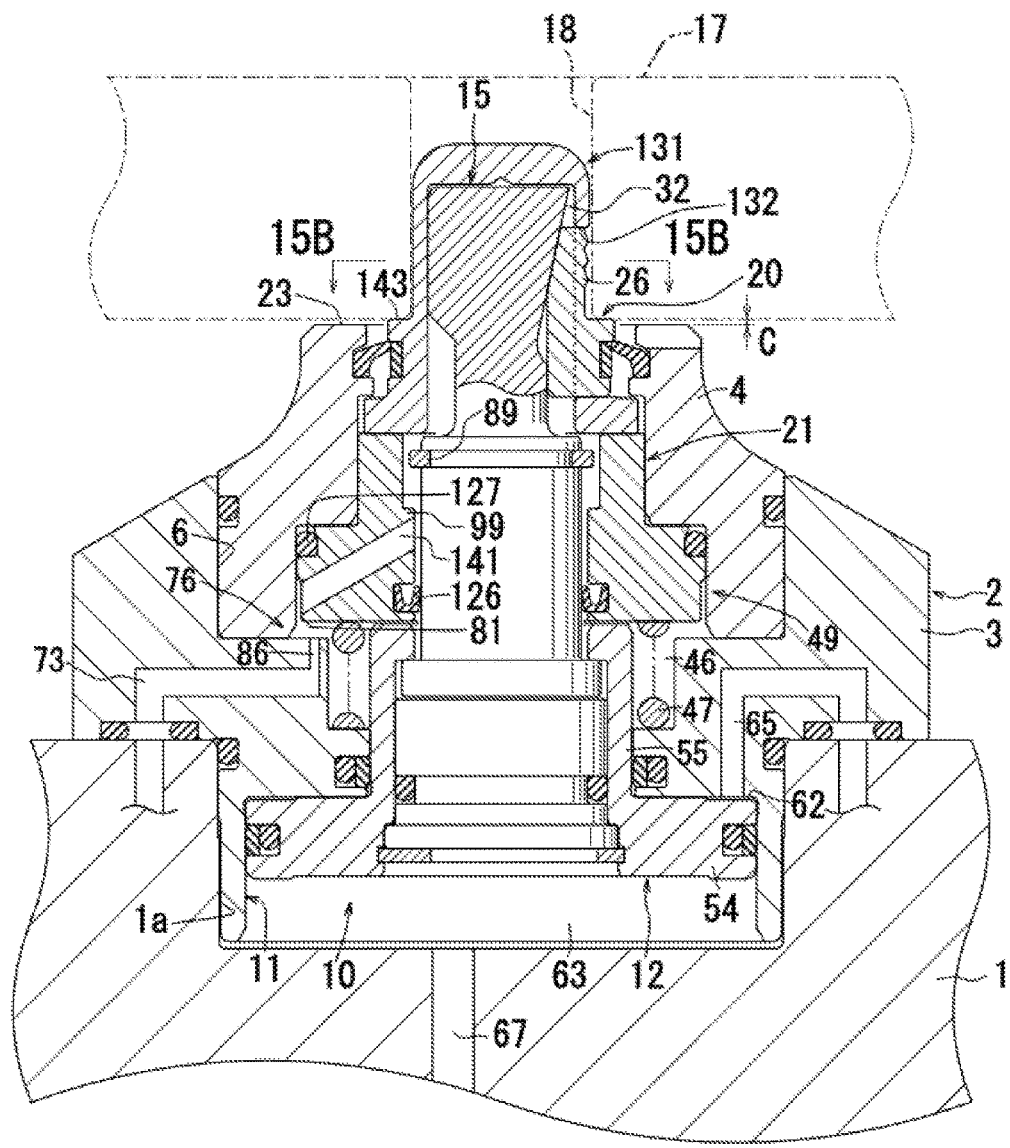

CLAMP DEVICE

TECHNICAL FIELD

The present invention relates to a clamp device for, by internally expanding an inner circumferential surface of a hole formed in an object to be fixed such as a workpiece or a die, clamping the object to a stationary-side member such a table. More specifically, the present invention relates to a technology for providing the clamp device with a malfunction detection mechanism.

BACKGROUND ART

Of these types of clamp device, a clamp device has conventionally been described in Patent Literature 1 (Japanese Patent No. 4297511). The conventional technology is configured as follows:

A clamping rod and a piston are arranged one above the other in a housing, and a plurality of engagement members (grippers) are circumferentially arranged on an outer circumference of an upper part of the clamping rod. The engagement members are retained at a raised position by upward hydraulic pressure exerted on an annular pressure-receiving member.

During lock driving, a workpiece is first caused to move downward with respect to the plurality of engagement members. This causes a hole in the workpiece to be fitted on the engagement members. After that, the piston causes the clamping rod to move downward. Then, a wedge face provided in the upper part of the clamping rod causes the engagement members retained at the raised position by the annular pressure-receiving member to move radially outward, so that thin-walled grip parts provided in upper parts of the engagement members strongly grip an inner circumferential surface of the hole in the workpiece. Next, in the gripped state, the piston causes the engagement members and the annular pressure-receiving member via the wedge face of the clamping rod to move downward in an integrated manner (lock stroke), and the engagement members pull the workpiece downward so that the workpiece is fixed to a stationary-side member. In the lock state, the piston has a lock margin stroke formed below the lock stroke.

The conventional technology thus configured is such that in a case where, during downward movement of the clamping rod for locking, the grip parts of the engagement members slip downward with respect to the inner circumferential surface of the hole in the workpiece, the clamping rod and the piston, which have been wedge-engaged on the engagement members, move downward to the locking margin stroke region beyond the lock stroke region, so that the engagement members and the annular pressure-receiving member, too, move downward in an integrated manner. This causes a collar portion provided in an upper part of the annular pressure-receiving member to push a valve member open downward, and at the same time, the collar portion is received by a stopper portion provided in the housing (see FIGS. 5 and 6 of Patent Literature 1).

Since opening of the aforementioned valve member causes a decrease in pressure of pressurized air for use in detection, a malfunction due to the slip is detected by detecting the decrease in pressure with a pressure switch.

That is, in the conventional technology, the annular pressure-receiving member, which moves downward in an integrated manner with the engagement members (grippers), serves as an actuating portion for a malfunction.

CITATION LIST

Patent Literature 1
Japanese Patent No. 4297511

SUMMARY OF INVENTION

Technical Problem

The conventional technology has the following problems:

In a case where the clamp device has been lock-driven in a state in which the workpiece has yet to be carried in (i.e. in the case of idle clamping), the plurality of engagement members retained at the raised position by upward hydraulic pressure acting on the annular pressure-receiving member are caused by the wedge face of the clamping rod to move radially outward but are not received by the inner circumferential surface of the hole in the workpiece, and are therefore excessively expanded in diameter. This causes the clamping rod and the piston to move downward, leaving behind the engagement members and the annular pressure-receiving member at the raised position. Therefore, the annular pressure-receiving member serving as the actuating portion cannot detect the malfunction.

Further, in a case where a thin portion formed at a certain height of the clamping rod breaks due to metal fatigue or the like in the lock state in which the workpiece is fixed to the stationary-side member by the engagement members of the clamp device, a lower half part of the broken clamping rod and the piston move downward, leaving behind the engagement members and the annular pressure-receiving member. Therefore, in this case, too, the annular pressure-receiving member serving as the actuating portion cannot detect the malfunction.

Incidentally, when the hole in the workpiece is fitted on the engagement members by causing the workpiece to move downward with respect to the plurality of engagement members of the clamp device, a lower part of a circumferential wall of the hole may collide with any of the engagement members and the impact of the collision may cause a defect in the thin-walled grip part.

Lock driving of the clamp device without notice of such a defect in any of the grip parts causes the engagement member whose grip part is defective to be excessively expanded in diameter without being received by the inner circumferential surface of the hole in the workpiece, and the remaining engagement members, too, hardly exert gripping forces on the inner circumferential surface of the hole. In such an abnormal gripped state, the engagement members are retained at the raised position by the annular pressure-receiving member, so the clamping rod and the piston move downward, leaving behind the engagement members and the annular pressure-receiving member. Therefore, in this case, too, the annular pressure-receiving member serving as the actuating portion cannot detect the malfunction.

It is an object of the present invention to provide a clamp device that is free from the foregoing problems.

Solution to Problem

In order to attain the foregoing object, a clamp device is configured as indicated by each invention recited in the Claims.

BRIEF DESCRIPTION OF DRAWINGS

FIG. 15A illustrates a release state of a clamp device according to Embodiment 6 of the present invention. FIG. 15B is a cross-sectional view taken along the line 15B-15B in FIG. 15A.

DESCRIPTION OF EMBODIMENTS

Figure 1:
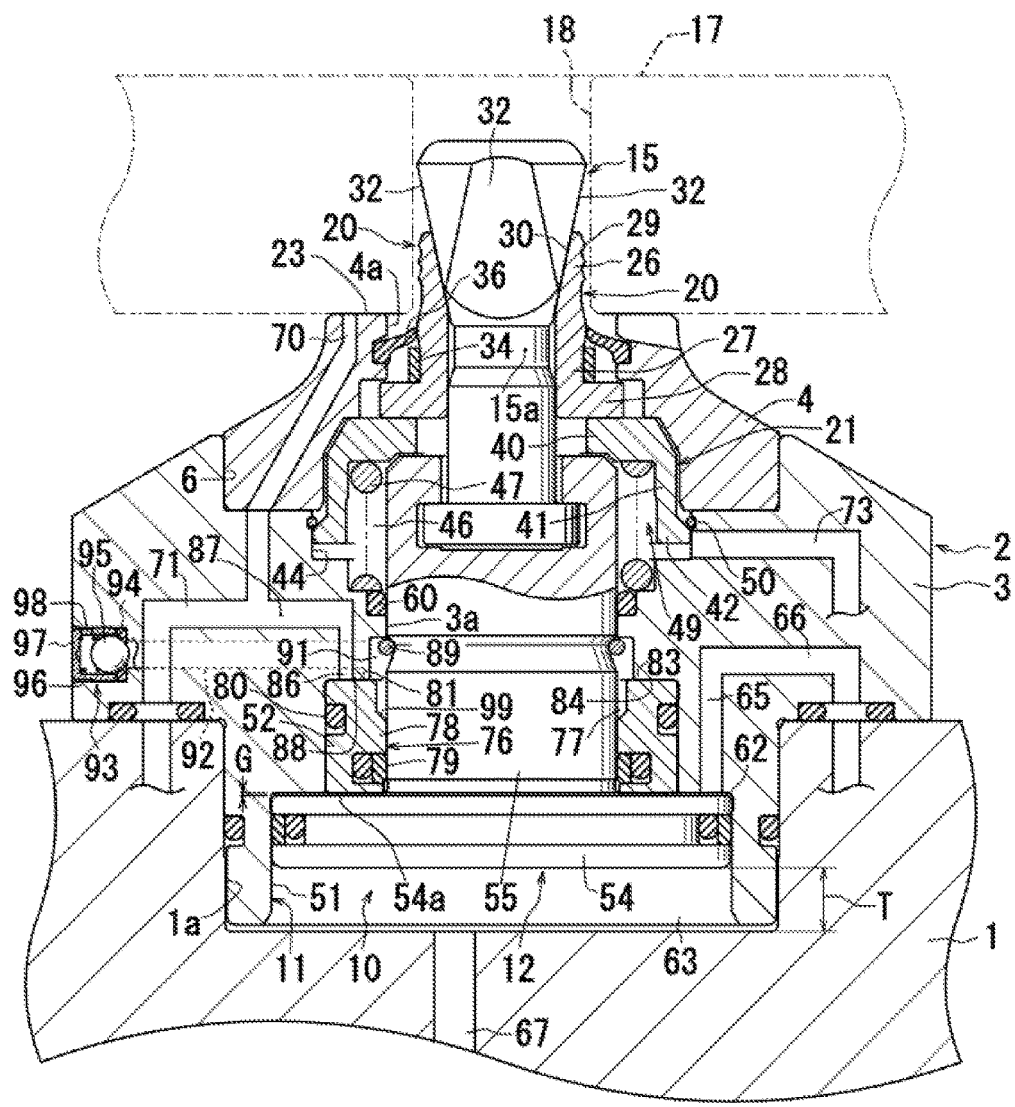
FIG. 1 is an elevational cross-sectional view of a release state of a clamp device according to Embodiment 1 of the present invention.
Figure 2:
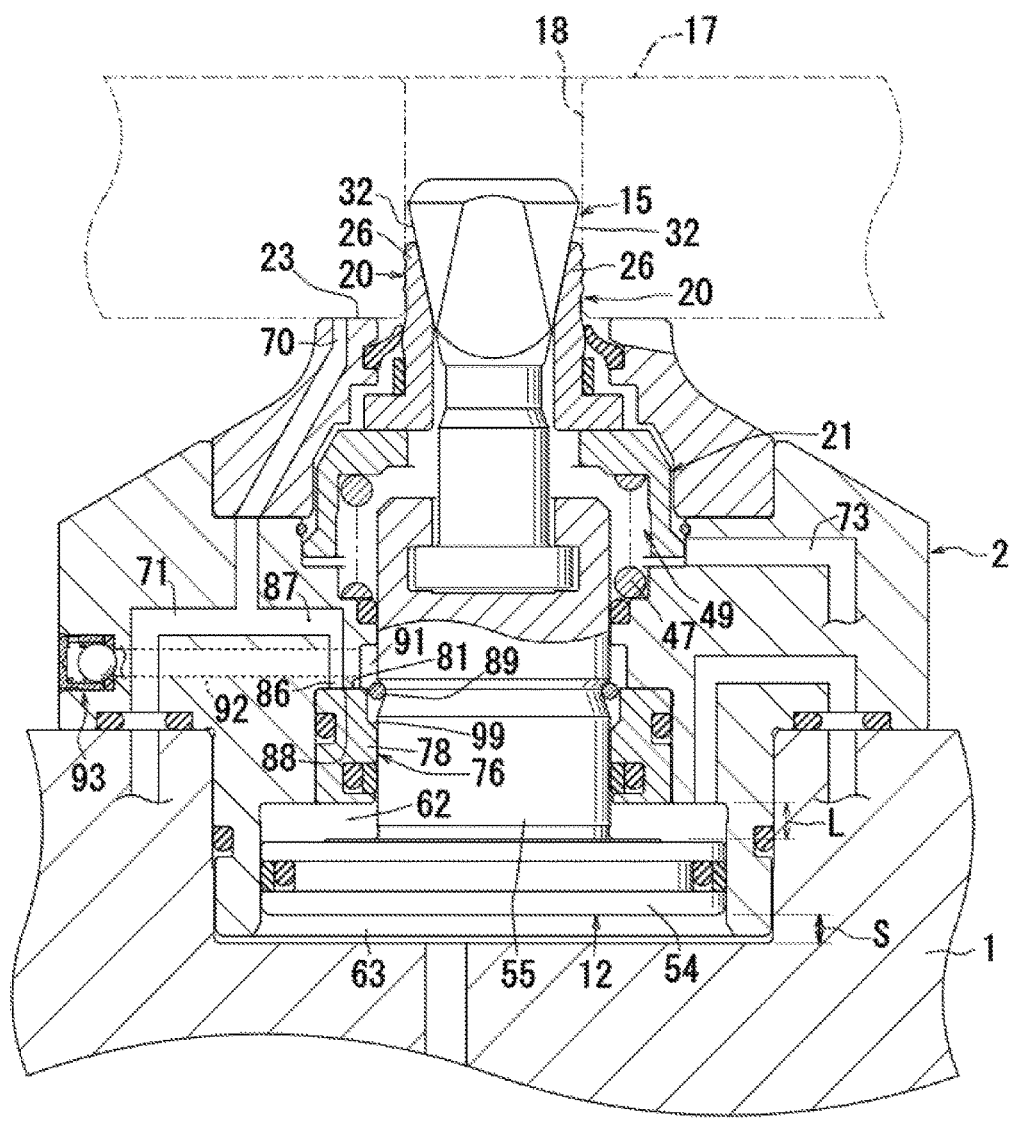
FIG. 2, which is similar to FIG. 1, illustrates a lock state of the clamp device.
Figure 3:
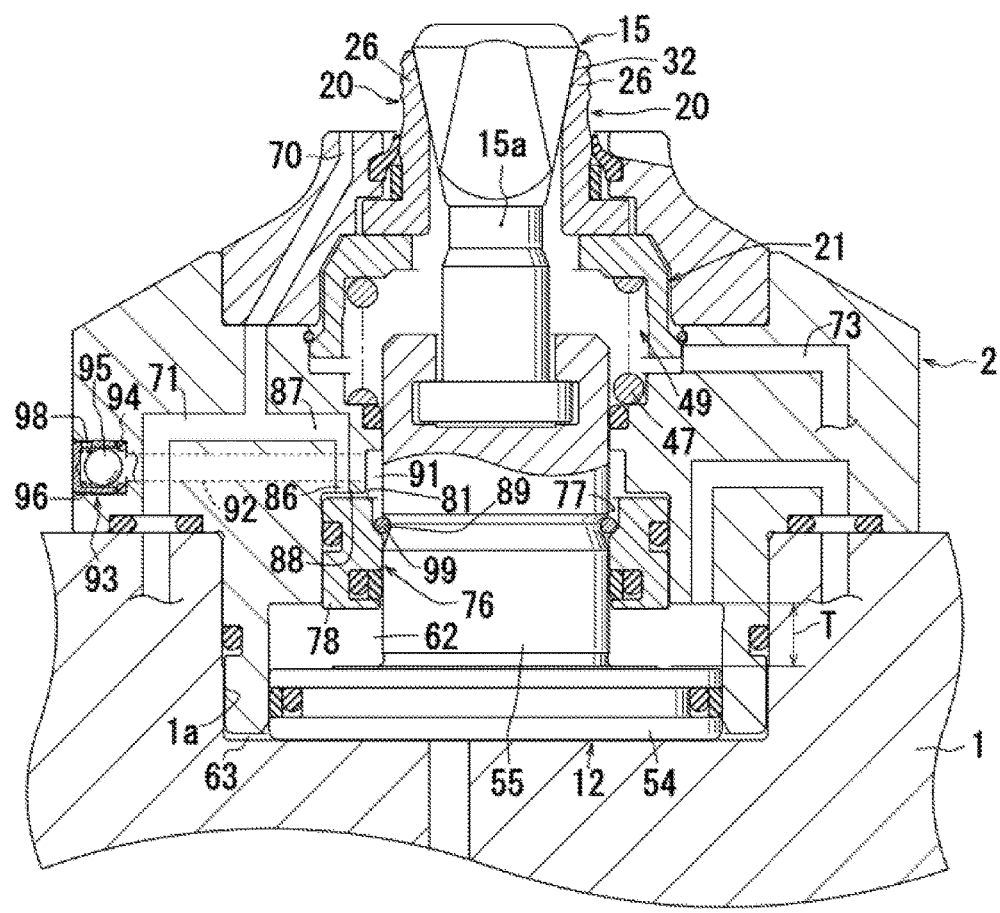
FIG. 3, which is similar to FIG. 1, illustrates an idle clamping state (malfunctioning state) of the clamp device.

FIGS. 1 through 3 each illustrate Embodiment 1 of the present invention.

The following description will first discuss a structure of such a clamp device mainly with reference to FIG. 1.

To a base plate 1 placed on a table of a machine tool, a housing 2 of a clamp device is fixed. The housing 2 includes a lower housing 3 and an upper housing 4.

A lower half part of the lower housing 3 is hermetically inserted in a mounting hole 1a in the base plate 1. An upper half part of the lower housing 3 is fixed by a plurality of mounting bolts (not illustrated) to an upper surface of the base plate 1.

The upper housing 4 is fixed by a plurality of fastening bolts (not illustrated) to a bottom surface of an attachment hole 6 formed as a recess in an upper part of the lower housing 3.

In a lower part of the housing 2, a hydraulic cylinder 10 serving as a drive mechanism is provided. The hydraulic cylinder 10 includes a cylinder hole 11 formed upward from a lower surface of the lower housing 3 and a piston 12 inserted in the cylinder hole 11.

A total stroke T (see FIGS. 1 and 3) of the piston 12 has a lock stroke L and a margin stroke S (see FIG. 2). The margin stroke S is a sum of a lock margin stroke and an abnormal stroke formed in order from top to bottom (neither of which is given a reference sign). That is, the abnormal stroke region corresponds to a last-stage stroke region (lower-limit region) in a lock direction of the total stroke T.

In an upper part of the housing 2, as will be mentioned later, a clamping rod 15 is provided so as to be movable vertically (axially) and movable horizontally (radially). In Embodiment 1 (and other embodiments described below), the clamping rod 15 is release-driven by being moved upward (toward the top end) by the piston 12, and is lock-driven by being moved downward (toward the base end) by the piston 12.

On an outer circumference of the upper part of the clamping rod 15, a plurality of engagement members 20 that are inserted in a hole 18 in a workpiece (object to be fixed) 17 and a cylindrical supporting member 21 are arranged one above the other. On an upper surface of the upper housing 4 on an outer circumferential side of the engagement members 20, a seating face 23 that receives a lower surface of the workpiece 17 is annularly formed.

In this embodiment, four of these engagement members 20 are circumferentially provided at predetermined intervals. Each of the engagement members 20 includes a thin-walled grip part 26 provided in an upper part thereof, a barrel part 27 provided at a certain height thereof, and a lower flange 28. On an outer circumference of the grip part 26, a plurality of sawtooth projections 29 are vertically formed. Further, on an inner circumference of each grip part 26, an inclined surface 30 is formed so as to become closer to an axis as it extends downward.

A wedge face (wedge part) 32 that is engaged on the inclined surface 30 from above is formed in the upper part of the clamping rod 15. Four of these wedge faces 32 are provided in correspondence with the inclined surfaces 30. In this embodiment, the wedge faces 32 and the inclined surfaces 30 are constituted by flat surfaces.

On the barrel parts 27 of the four engagement members 20, a thin-walled ring 34 made of an elastic member such as rubber is provided. An elastic force of the ring 34 biases the engagement members 20 radially inward.

Further, on a circumferential wall of an upper hole 4a in the upper housing 4, a dust seal 36 is provided. An elastic force of the dust seal 36 biases the clamping rod 15 and the engagement members 20 radially inward to an axis of the piston 12.

The cylindrical supporting member 21 includes an upper wall 40 that receives lower sides of the four engagement members 20, an annular wall 41 protruding downward from an outer circumferential part of the upper wall 40, and a flange 42 protruding radially outward from a lower part of the annular wall 41. The supporting member 21 is so inserted in a housing hole 44 provided in an upper part of the housing 2 as to be movable vertically. Further, an advancing spring 47 constituted by a compressed coil spring is provided in a spring chamber 46 provided on a lower side of the supporting member 21, and the advancing spring 47 biases the engagement members 20 upward via the supporting member 21. That is, in this embodiment, the advancing spring 47 and the supporting member 21 constitute a supporting mechanism 49 that pushes the engagement members 20 upward with a predetermined force.

It should be noted that a snap ring 50 is provided at an upper end part of a cylindrical hole in the lower housing 3. The snap ring 50 is a member for temporary erection of the supporting mechanism 49 and the like within the housing 2 during assembly of the clamp device.

The cylinder hole 11 has a large hole 51 and a small hole 52. The large hole 51 is formed below the small hole 52.

The piston 12 includes a piston body 54 hermetically inserted in the large hole 51 and a piston rod 55 protruding upward from the piston body 54. A portion of the piston rod 55 at a certain height is hermetically inserted in a rod hole 3*a* in the lower housing 3 via a sealing member 60. A lower part of the clamping rod 15 is fitted on an upper part of the piston rod 55 so as to be movable radially (horizontally).

A lock chamber 62 is formed on an upper side of the piston body 54, and a release chamber 63 is formed on a lower side of the piston body 54. The lock chamber 62 communicates with a locking supply and discharge port (not illustrated) via a vertical passage 65 and a horizontal passage 66 in the lower housing 3. Further, the release chamber 63 communicates with a releasing supply and discharge port 67.

Further, a seating detection hole 70 is bored in the seating face 23 formed on the upper surface of the upper housing 4. The detection hole 70 communicates via an air supply passage 71 with a supply port (not illustrated) of pressurized air for use in abnormality detection.

Furthermore, a passage 73 for use in air blow is bored through a lower part of the spring chamber 46. Pressurized air for use in air blow that has been supplied to the passage 73 is discharged out of the housing 2 through the spring chamber 46, a gap formed between the upper wall 40 of the supporting member 21 and an upper end part of the piston rod 55, a gap between adjacent engagement members 20, and the like.

The clamp device thus configured is provided with a mechanism for detecting a malfunction (clamp defect). As illustrated in FIGS. 1 through 3, the detection mechanism is configured as follows:

An annular space is formed between the small hole 52 of the cylinder hole 11 and the piston rod 55, and a valve chamber 77 of a valve mechanism 76 is constituted by the annular space. A cylindrical valve member 78 is hermetically inserted in the valve chamber 77 via an inner sealing member 79 and an outer sealing member 80. Outer dimensions of the valve member 78 are set at smaller values than outer dimensions of the piston body 54.

A step part 83 is formed between the small hole 52 and the rod hole 3*a*, and an inlet 86 of the valve mechanism 76 is bored in a downward annular end face 84 formed in a lower part of the step part 83. The inlet 86 communicates with the air supply passage 71 via an inlet passage 87.

A valve face 81 is provided on an upper end face of the valve member 78 (that faces the top end). From a lower side, the valve face 81 faces a valve seat 88 provided on an area around an open end of the inlet 86.

Further, an outlet 91 of the valve mechanism 76 is formed between an inner circumferential surface of the step part 83 and an outer circumferential surface of the piston rod 55. The outlet 91 communicates with the outside of the housing 2 via a check valve 93 provided in an outlet passage 92.

The check valve 93 includes a valve seat 94 provided in the outlet passage 92, a ball 95 which makes contact with the valve seat 94 from the outside, a spring 96 that biases the ball 95 against the valve seat 94 with a weak force, and a casing 97 that receives a left end part of the spring 96. In the casing 97, an outlet hole 98 that communicates with an external space is formed.

Furthermore, an actuating portion 89 constituted by a snap ring is fitted on a portion of the piston rod 55 at a certain height. As described below in FIG. 3, the actuating portion 89 functions to, when the piston 12 moves downward to the abnormal stroke region (lower-limit region as a last-stage stroke region in a lock direction of the total stroke T), cause the valve member 78 via an actuated portion 99 of the valve member 78 to move downward.

As illustrated in FIGS. 1 through 3, the clamp device thus configured operates as follows:

In the release state illustrated in FIG. 1, pressure oil is discharged out of the lock chamber 62, and pressure oil is supplied into the release chamber 63. This causes the piston 12 and the clamping rod 15 to rise, causes the supporting member 21 and the plurality of engagement members 20 to be retained at the raised position by the advancing spring 47, and causes the engagement members 20 to be switched into a reduced diameter state by the elastic force of the ring 34.

Further, the engagement members 20 and the clamping rod 15 are positioned coaxially with the axis of the piston 12 by the elastic force of the dust seal 36.

Furthermore, the valve member 78 of the valve mechanism 76 is raised by an annular protruding part 54*a* provided at a middle part of an upper end face of the piston body 54, and the valve face 81 closes the valve seat 88. A contacting gap G is formed between an outer circumferential portion of the upper end face of the piston body 54 and an upper wall of the lock chamber 62.

In the release state, the workpiece 17 is caused by any sort of raising and descending means or by its own weight to move downward, and the engagement members 20 are inserted into the hole 18 in the workpiece 17. Then, the lower surface of the workpiece 17 is received by the seating face 23 and closes the seating detection hole 70.

For the clamp device to switch from the release state illustrated in FIG. 1 to the lock state illustrated in FIG. 2, the pressure oil is discharged out of the release chamber 63, and the pressure oil is supplied into the lock chamber 62.

Then, the piston 12 and the clamping rod 15 move downward with respect to the supporting member 21 and the engagement members 20 retained at the raised position by a biasing force of the advancing spring 47.

This causes the engagement members 20 to be expanded in diameter (to be moved radially outward) by a wedge face 32 of the clamping rod 15 so that the engagement members 20 are engaged on the inner circumferential surface of the hole 18 in the workpiece 17 as illustrated in the lock state illustrated in FIG. 2. After that, a downward force of the clamping rod 15 causes the engagement members 20 having contacted closely with the inner circumferential surface of the hole 18 to pull the workpiece 17 downward via the hole 18, and at the same time, the engagement members 20 and the supporting member 21 move downward against the biasing force of the advancing spring 47. This causes the workpiece 17 to be strongly pressed against the seating face 23.

In the lock state illustrated in FIG. 2, the valve member 78 of the valve mechanism 76 raised by a pressure of the lock chamber 62, so that the valve face 81 closes the valve seat 88 and the seating detection hole 70 is closed by the lower surface of the workpiece 17.

Therefore, in the lock state, the pressure of pressurized air for use in abnormality detection that has been supplied to the air supply passage 71 rises. This makes it possible to confirm that the clamp device is operating normally.

For the clamp device to switch from the lock state illustrated in FIG. 2 to the release state illustrated in FIG. 1, the pressure oil needs only be discharged out of the lock chamber 62, and the pressure oil needs only be supplied into the release chamber 63. This allows the clamp device to be switched to the release state by executing the steps of the procedure for the aforementioned lock operation in substantially reverse order.

At the time of a malfunction, the clamp device operates as follows:

With the workpiece 17 yet to be carried in (or with the workpiece 17 yet to be carried in a predetermined position), the workpiece 17 does not close the seating detection hole 70, so that the pressurized air in the air supply passage 71 is discharged out of the housing 2 through the detection hole 70. For this reason, a pressure of the air supply passage 71 does not reach a set value. This makes it possible to detect a seating abnormality in the workpiece 17.

However, in a case where the detection hole 70 is clogged with foreign matters such as chips, the pressure of the air supply passage 71 reaches the set value even in a state in which the workpiece 17 has yet to be carried in. This makes it impossible to detect a seating abnormality in the workpiece 17. Further, in a case where a workpiece 17 whose hole 18 has an inside diameter beyond the acceptable range has been carried in, a lower surface of the workpiece 17 closes the detection hole 70, and the pressure of the air supply passage 71 reaches the set value. This makes it impossible to detect that a workpiece 17 having an excessively large hole diameter has been carried in.

In a case where the clamp device has been lock-driven in a state in which the workpiece 17 has yet to be carried in or in which a workpiece 17 having an excessively large hole diameter has been carried in (i.e. in the case of idle clamping), the plurality of engagement members 20 retained at the raised position by the biasing force of the advancing spring 47 are moved radially outward by the wedge face 32 of the clamping rod 15 as illustrated in FIG. 3; however, the engagement members 20 are not received by the inner circumferential surface of the hole 18 (see FIG. 1 or 2) in the workpiece 17, and are therefore excessively expanded in diameter. In such an excessively expanded diameter state, the clamping rod 15 and the piston 12 move downward, leaving behind the engagement members 20 and the supporting member 21 at the raised position.

Moreover, when the piston 12 moves downward to the abnormal stroke region as a last-stage stroke region (lower-limit region) in a lock direction, the actuating portion 89 of the piston rod 55 causes the valve member 78 via the actuated portion 99 of the valve member 78 to move downward and the lower surface of the piston 12 is received by a bottom wall of the release chamber 63 (bottom wall of the mounting hole 1*a* in the base plate 1).

Then, the pressurized air for use in abnormality detection that has been supplied to the air supply passage 71 flows out to the outlet passage 92 through the inlet 86 of the valve mechanism 76, an upper part of an internal space in the valve chamber 77, and the outlet 91 in this order. Next, the pressurized air causes the ball 95 of the check valve 93 provided in the outlet passage 92 to be separated from the valve seat 94 against the spring 96. After that, the pressurized air is discharged out of the housing 2 through the outlet hole 98.

For this reason, the pressure of the air supply passage 71 does not reach the set value. This makes it possible to, by detecting the decrease in pressure with a pressure switch or the like, detect that the clamp device is malfunctioning.

Further, in a case where a thin portion 15*a* formed on the lower side of the wedge face 32 at a certain height of the clamping rod 15 breaks, for example, due to metal fatigue or the like in the lock state (see FIG. 2) in which the workpiece 17 is fixed by the clamp device, a lower half part of the broken clamping rod 15 and the piston 12 move downward, leaving behind the supporting member 21 and the engagement members 20 retained at the raised position by the biasing force of the advancing spring 47. Then, as in the case of idle clamping illustrated in FIG. 3, the actuating portion 89 of the piston rod 55 causes the valve member 78 via the actuated member 99 to move downward. Therefore, the pressure of the air supply passage 71 does not reach the set value. This makes it possible to detect a malfunction in the clamp device.

Incidentally, as illustrated in FIG. 1, when the hole 18 in the workpiece 17 is fitted on the engagement members 20 by causing the workpiece 17 to move downward with respect to the plurality of engagement members 20 of the clamp device, a lower part of a circumferential wall of the hole 18 may collide with any of the engagement members 20 and the impact of the collision may cause a defect in the thin-walled grip part 26. In this case, the clamp device operates as follows:

Lock driving of the clamp device without notice of such a defect in any of the grip parts 26 causes the engagement member 20 whose grip part 26 is defective to be excessively expanded in diameter without being received by the inner circumferential surface of the hole 18 in the workpiece 17, and the remaining engagement members 20, too, hardly exert gripping forces on the inner circumferential surface of the hole 18, as in the case of FIG. 3. In such an abnormal gripped state, the engagement members 20 are retained at the raised position by the supporting member 21, so the clamping rod 15 and the piston 12 move downward, leaving behind the engagement members 20 and the supporting member 21. Then, as in the case of idle clamping illustrated in FIG. 3, the actuating portion 89 of the piston rod 55 causes the valve member 78 via the actuated member 99 to move downward. Therefore, the pressure of the air supply passage 71 does not reach the set value. This makes it possible to detect a malfunction in the clamp device.

FIGS. 4 through 20 illustrate modifications of Embodiment 1 or other embodiments. In these modifications and the other embodiments, members identical (or similar) to those constituting Embodiment 1 are given the same reference numerals.

Figure 4:
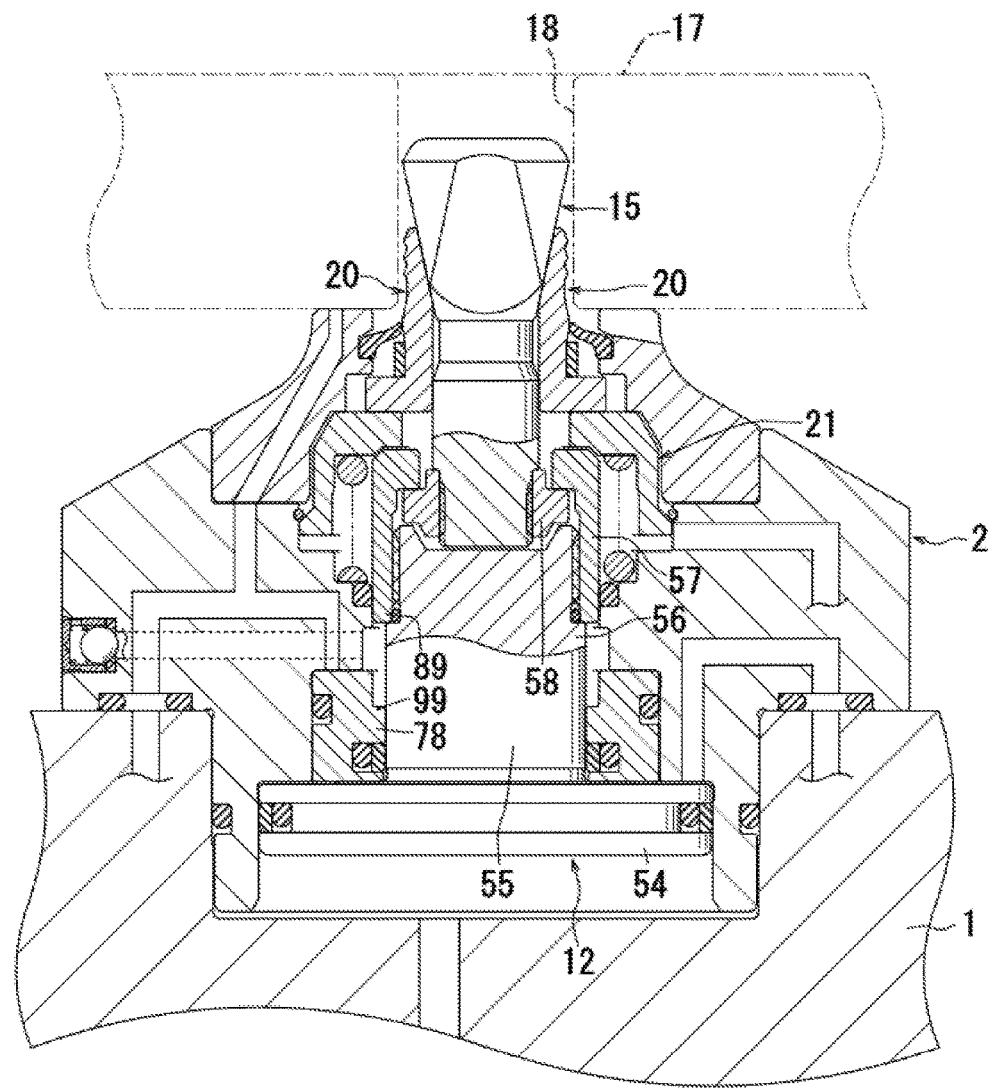
FIG. 4, which is equivalent to FIG. 1, illustrates a first modification of the clamp device.

FIG. 4, which is equivalent to FIG. 1, illustrates a first modification of Embodiment 1. The first modification illustrated in FIG. 4 is a specific example of a structure of coupling between the clamping rod 15 and the piston rod 55, and constituent elements different from those of the structure illustrated in FIG. 1 are given reference numerals and described here.

That is, the piston rod 55 includes a rod body 56 and a retaining nut 57 screwed to an upper part of the rod body 56. Between the upper part of the rod body 56 and an upper part of the retaining nut 57, a leg nut 58 screwed to a lower part of the clamping rod 15 is fitted so as to be movable radially. The actuating portion 86 is integrally provided at a lower end part of the retaining nut 57. Further, the actuated portion 99 is provided in an upper part of a cylindrical hole in the valve member 78.

It should be noted that the structure of coupling between the clamping rod 15 and the piston rod 55 can of course come in various forms other than the specific example illustrated in FIG. 4. The same applies to the other embodiments described below.

Figure 5:
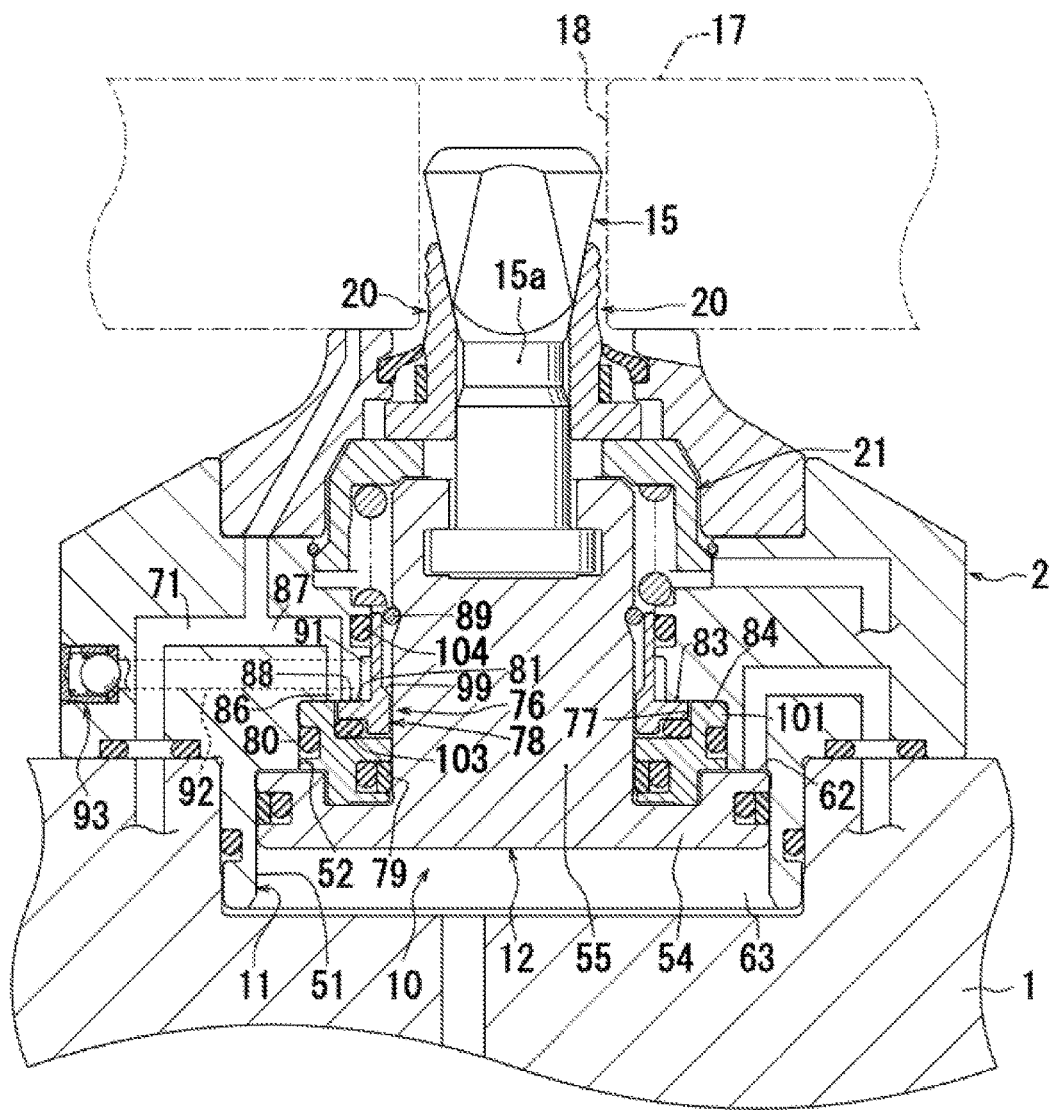
FIG. 5, which is equivalent to FIG. 1, illustrates a second modification of the clamp device.

FIG. 5, which is equivalent to FIG. 1, illustrates a second modification of Embodiment 1. In the second modification illustrated in FIG. 5, too, constituent elements different from those of the structure illustrated in FIG. 1 are given reference numerals and described here.

That is, on an upper side of the lock chamber 62 between the cylinder hole 11 and the piston rod 55, an annular partition wall 101 is hermetically inserted via the inner sealing member 79 and the outer sealing member 80. An annular space is formed between the annular partition wall 101 and the piston rod 55, and a cylindrical valve member 78 is inserted in the annular space so as to be movable vertically. The inlet 86 of the valve mechanism 76 is bored in the downward annular end face 84 provided in the step part 83. The valve member 78 is configured to be able to face a lower side of the inlet 86, and the valve face 81 is provided on an end face of the valve member 78 that faces an upper end.

A lower sealing member 103 is provided between a lower part of the valve member 78 and an upper part of the partition wall 101, and an upper sealing member 104 is provided between an upper outer circumference of the valve member 78 and the lower housing 3. The valve member 78 is brought into contact with the valve seat 88 by an elastic force of the lower sealing member 103. The outlet 91 of the valve mechanism 76 is annularly formed on an outer circumferential side at a certain height of the cylindrical valve member 78, and communicates with the outside of the housing 2 via the outlet passage 92 and the check valve 93.

According to the foregoing structure, during lock driving starting from the release state illustrated in FIG. 5, the pressure of a pressurized fluid supplied to the lock chamber 62 is received by the step part 83 via the partition wall 101 and does not act on the valve member 78. Then, during idle clamping of the clamp device, the actuating portion 89 causes the valve member 78 via the actuated portion 99 to move downward against the lower sealing member 103.

Then, the pressurized air for use in abnormality detection that has been supplied to the air supply passage 71 flows out to the outlet passage 92 through the inlet 86 of the valve mechanism 76, the upper part of the internal space in the valve chamber 77, and the outlet 91 in this order. After that, the pressurized air is discharged out of the housing 2.

For this reason, the pressure of the air supply passage 71 does not reach the set value. This makes it possible to detect a malfunction in the clamp device.

Figure 6:
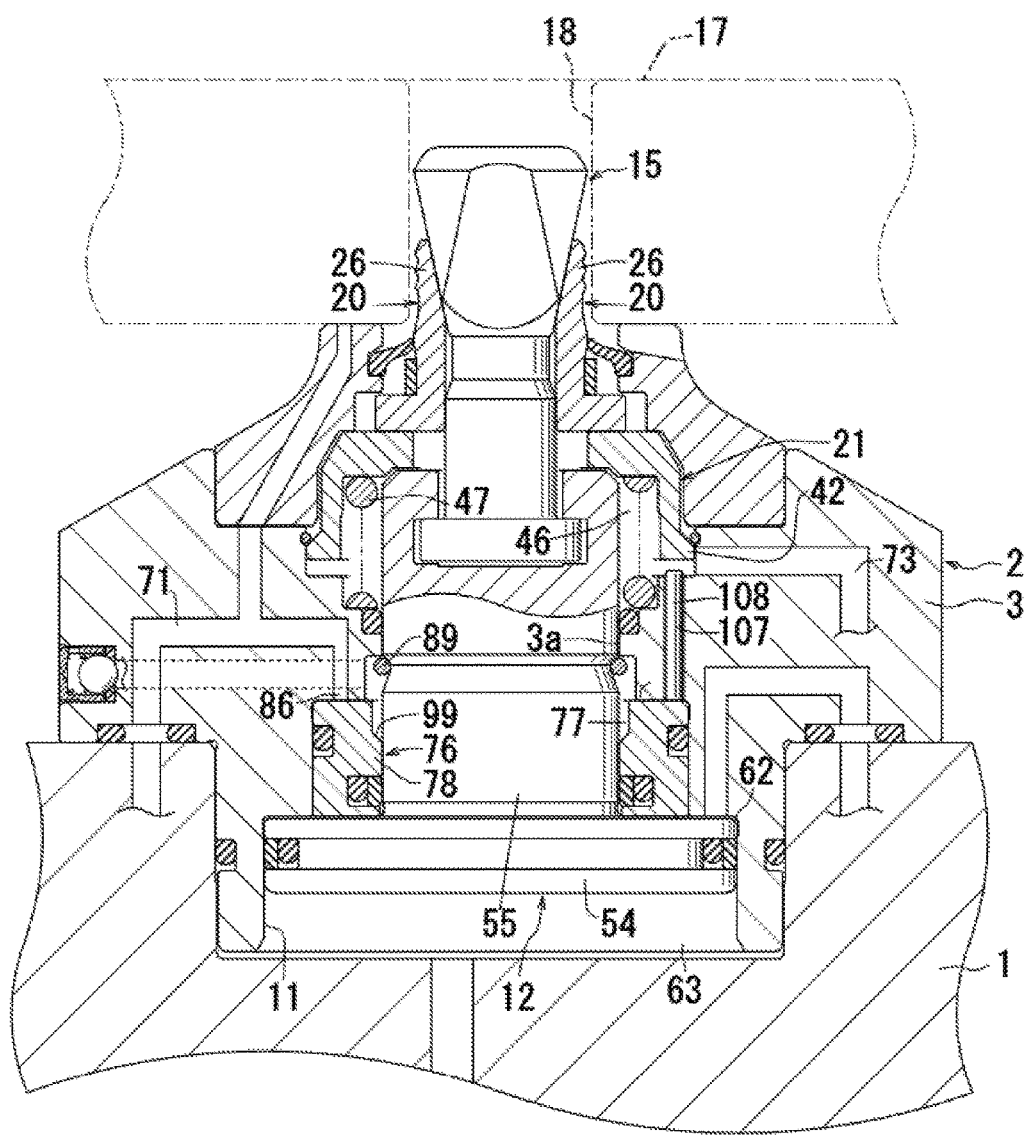
FIG. 6, which is equivalent to FIG. 1, illustrates a third modification of the clamp device.

FIG. 6, which is equivalent to FIG. 1, illustrates a third modification of Embodiment 1. In the third modification illustrated in FIG. 6, too, constituent elements different from those of the structure illustrated in FIG. 1 are given reference numerals and described here.

That is, in a circumferential wall of the rod hole 3a in the lower housing 3, a plurality of through-holes 107 are circumferentially formed at intervals so as to cause the spring chamber 46 and the valve chamber 77 to communicate with each other (here, only one of those through-holes 107 are illustrated). An actuating pin 108 is inserted in each of the through-holes 107.

In the release state illustrated in FIG. 6, the piston body 54 of the piston 12 raises the actuating pin 108, and a predetermined contacting gap is formed between an upper end part of the actuating pin 108 and the flange 42 of the supporting member 21.

In a case where, during lock driving, the grip parts 26 of the engagement members 20 slip with respect to the inner circumferential surface of the hole 18 in the workpiece 17, the engagement members 20 and the supporting member 21 move downward, so that the flange 42 pushes the valve member 78 open downward via the actuating pin 108. Since opening of the valve member 78 causes a decrease in pressure of pressurized air for use in detection that has been supplied to the air supply passage 71, a malfunction due to the slip is detected.

It should be noted that at the time of a malfunction such as the idle clamping, the actuating portion 89 of the piston rod 55 pushes the valve member 78 open downward via the actuated portion 99 as in the case of Embodiment 1, so the malfunction can be detected.

A structure in which the downward movement of the supporting member 21 by the slip is transmitted to the valve member 78 via the illustrated actuating pin 108 is preferably applied to the second modification illustrated in FIG. 5.

Figure 7:
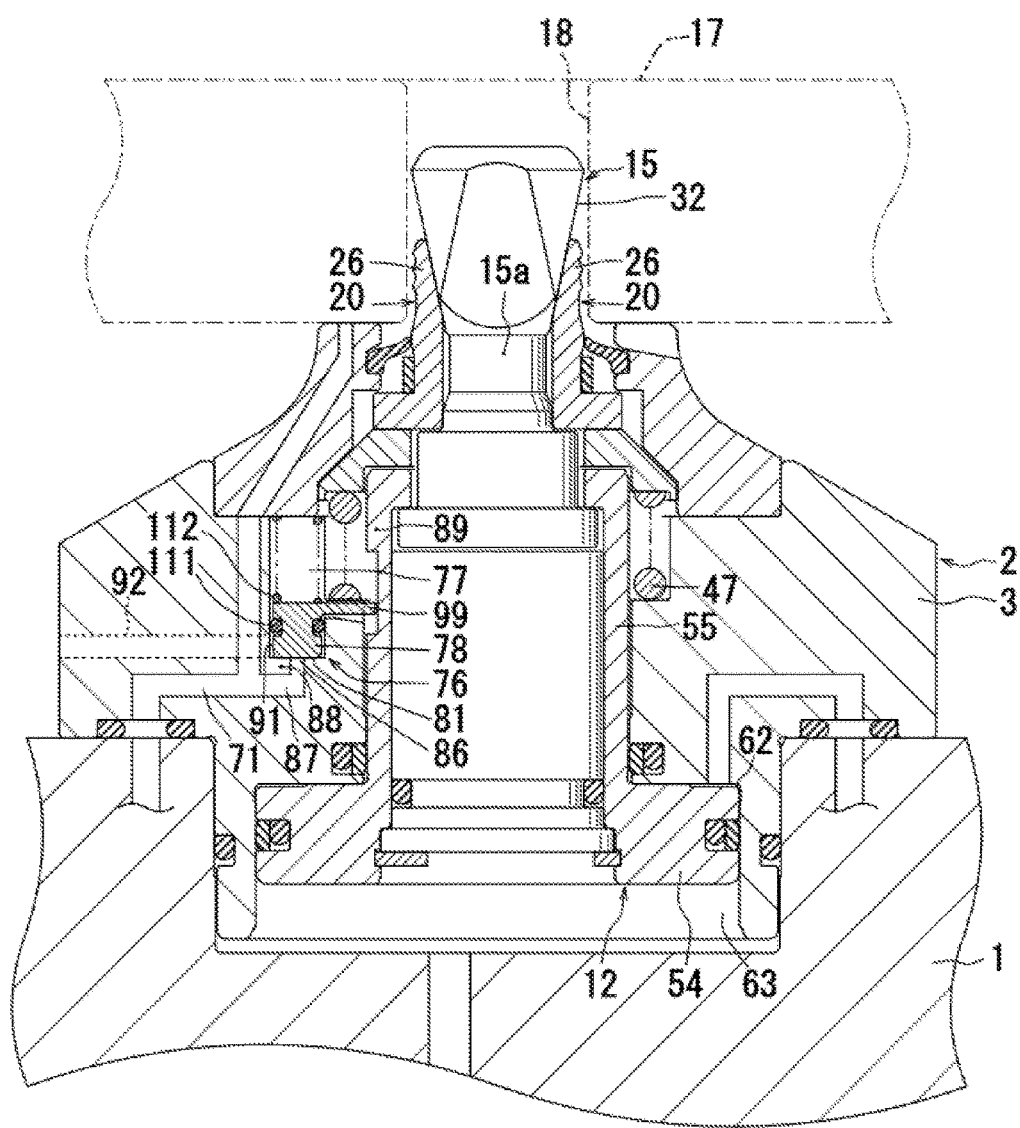
FIG. 7 illustrates a release state of a clamp device according to Embodiment 2 of the present invention.

FIG. 7 illustrates a release state of a clamp device according to Embodiment 2 of the present invention. Embodiment 2 differs from Embodiment 1 of FIG. 1 in the following respect.

The valve chamber 77 of the valve mechanism 76 is cylindrically formed in the lower housing 3 on an outer circumferential side of the piston rod 55 in parallel with the piston rod 55. In the cylindrical valve chamber 77, the valve member 78 is swingably and hermetically inserted via a sealing member 111. The valve member 78 is biased downward (in a valve-closing direction) by a spring (elastic member) 112.

The inlet 86 of the valve mechanism 76 is bored upward to the valve chamber 77. Further, the valve face 81 facing the inlet 86 is provided at a lower end of the valve member 78. Furthermore, an upper part of the valve member 78 protrudes radially inward to an axis of the piston rod 55. The protruding part is provided with the actuated portion 99.

At the time of a malfunction such as the idle clamping, the actuating portion 89 of the piston rod 55 causes the valve member 78 via the actuated portion 99 to swing clockwise as in the case of Embodiment 1. Then, the pressurized air for use in abnormality detection that has been supplied to the air supply passage 71 is discharged out of the housing 2 after passing through the inlet 86 of the valve mechanism 76, a lower space in the valve chamber 77, the outlet 91, and the outlet passage 92 in this order. For this reason, the pressure of the air supply passage 71 does not reach the set value. This makes it possible to detect a malfunction in the clamp device.

It should be noted that instead of being configured in the structure illustrated in FIG. 7, the valve mechanism 76 can be configured such that the inlet 86 is bored downward and the valve member 78 is biased upward.

Figure 8:
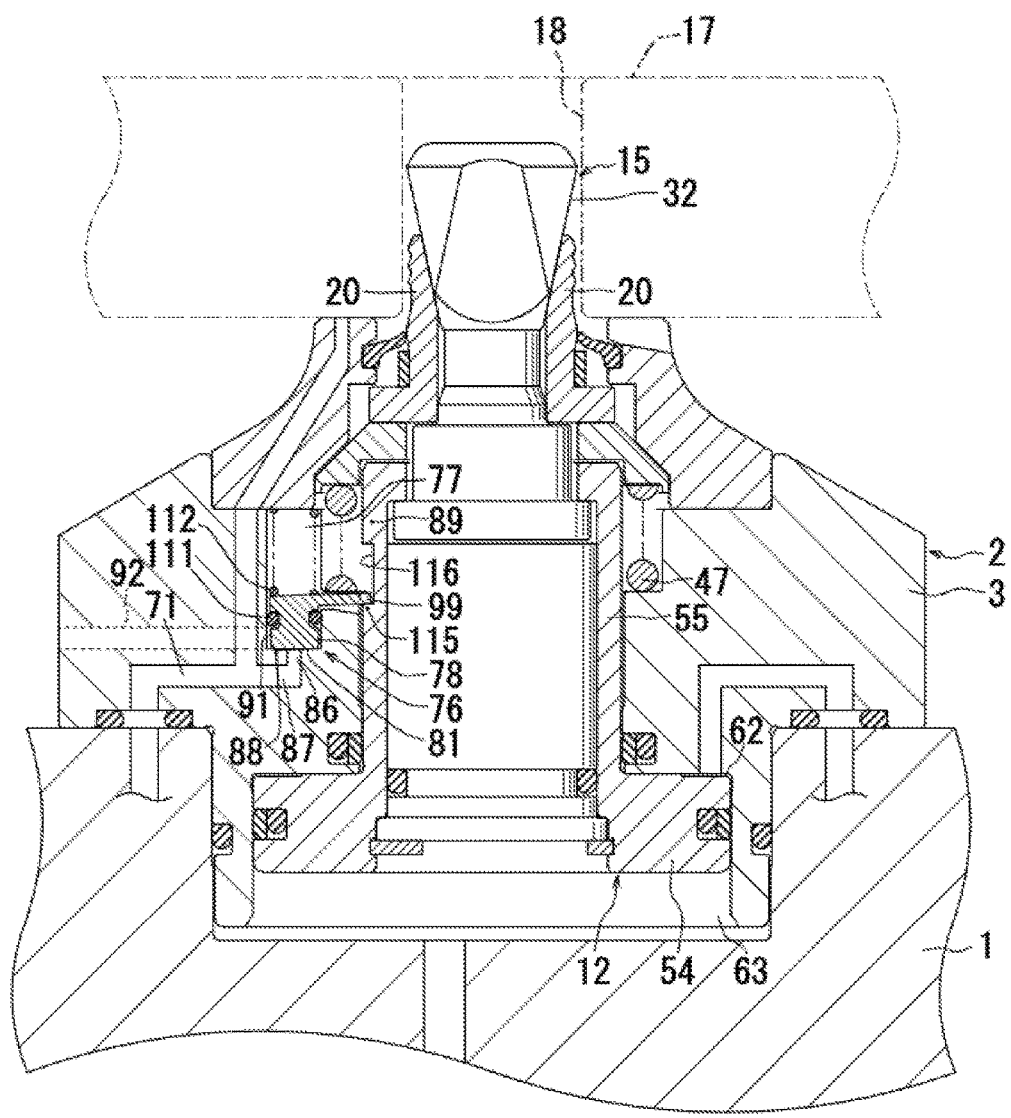
FIG. 8, which is equivalent to FIG. 7, illustrates a modification of Embodiment 2.

FIG. 8 illustrates a modification of Embodiment 2. This modification differs from Embodiment 2 of FIG. 7 in the following respect.

In the release state illustrated in FIG. 8, another actuating portion 115 of the piston rod 55 causes the valve member 78 via the actuated portion 99 to swing counterclockwise. This causes the pressurized air for use in abnormality detection that has been supplied to the air supply passage 71 to be discharged out of the housing 2 after passing through the inlet 86 of the valve mechanism 76, the lower space in the valve chamber 77, the outlet 91, and the outlet passage 92 in this order. For this reason, the pressure of the air supply passage 71 does not reach the set value. This makes it possible to detect that the clamp device is in a release state.

When the clamp device has been switched from the release state illustrated in FIG. 8 to a lock state (not illustrated), the actuated portion 99 is located at some midpoint on a vertical groove 116 formed between the actuating portion 89 and the actuating portion 115, so that the valve member 78 is brought into contact with the valve seat 88 by the spring (elastic member) 112. For this reason, the pressure of the air supply passage 71 reaches the set value. This makes it possible to detect that the clamp device is in a lock state.

Furthermore, at the time of a malfunction such as the idle clamping, the actuating portion 89 causes the valve member 78 via the actuated portion 99 to swing clockwise as in the case of Embodiment 2 illustrated in FIG. 7, and the pressurized air for use in abnormality detection that has been supplied to the air supply passage 71 is discharged out of the housing 2. This makes it possible to detect a malfunction in the clamp device.

FIGS. 9 through 12 illustrate Embodiment 3 of the present invention. Embodiment 3 differs from Embodiment 1 in the following respect.

Figure 9:
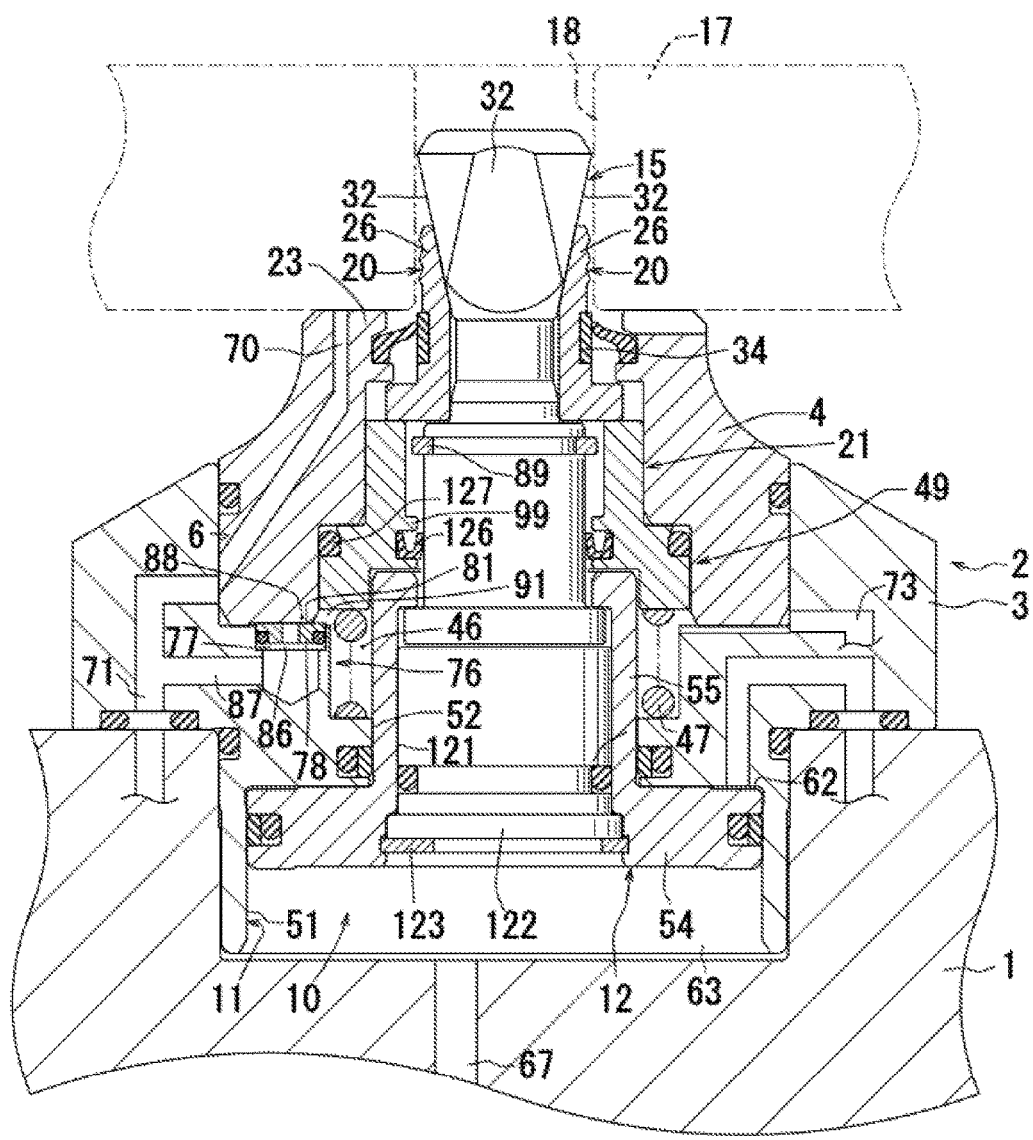
FIG. 9 illustrates a release state of a clamp device according to Embodiment 3 of the present invention.

As indicated by the release state illustrated in FIG. 9, a through-hole 121 is vertically formed in the piston 12, and the lower part of the clamping rod 15 is inserted in an upper part of the through-hole 121 so as to be movable radially. Downward movement of the clamping rod 15 is prevented by a retaining rod 122 hermetically inserted in the through-hole 121 and a snap ring 123. The same applies to the embodiments illustrated in FIG. 7 (and FIG. 8).

The supporting member 121 is hermetically inserted between the upper housing 4 and the clamping rod 15 via an inner sealing member 126 and an outer sealing member 127.

The valve mechanism 76 includes: a small-diameter valve chamber 77 formed between joint end faces of the lower housing 3 and the upper housing 4; and a cylindrical valve member 78 hermetically inserted in the valve chamber 77 so as to be movable vertically. An upper end face of the valve member 78 constitutes a valve face 81, and a valve seat 88 is formed on a lower end face of the upper housing 4. An inlet 86 provided in a lower part of the valve chamber 77 communicates with the air supply passage 71.

Further, an actuating portion 89 constituted by a snap ring is provided at a certain height of the clamping rod 15, and the actuated portion 99 is provided at a certain height of a cylindrical hole in the supporting member 21.

In the release state illustrated in FIG. 9, as in Embodiment 1, the piston 12 and the clamping rod 15 rise, and the supporting member 21 and the plurality of engagement members 20 are retained at the raised position by the advancing spring 47, and the engagement members 20 are switched into a reduced diameter state by an elastic force of a ring 34. The valve member 78 is raised by pressurized air from the air supply passage 71 and closes the valve seat 88. Further, the lower surface of the workpiece 17 is received by the seating face 23 of the housing 2 and closes the seating detection hole 70.

Figure 10:
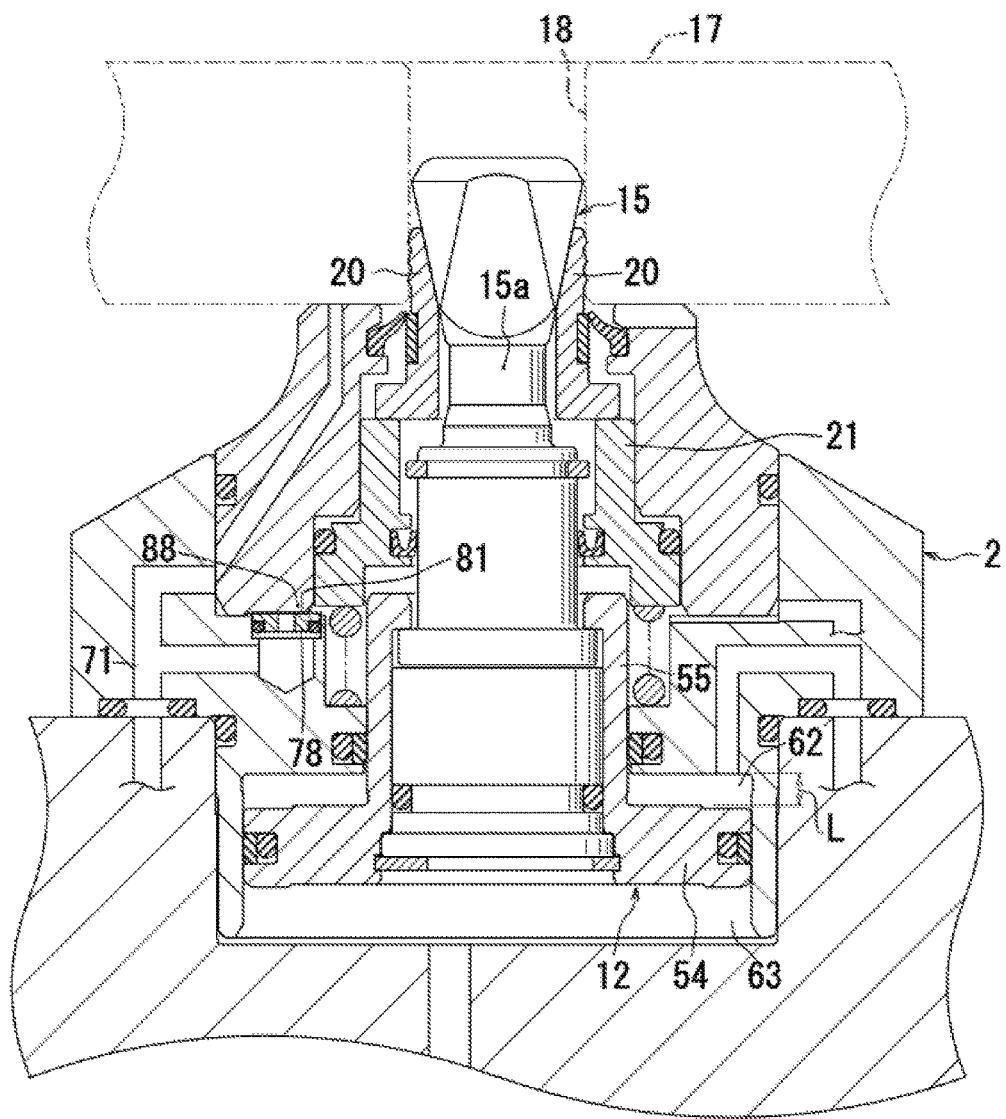
FIG. 10 illustrates a lock state of the clamp device.

For the clamp device to switch from the release state illustrated in FIG. 9 to the lock state illustrated in FIG. 10, the pressure oil is discharged out of the release chamber 63, and the pressure oil is supplied into the lock chamber 62. This causes the clamp device to operate in the same manner as in Embodiment 1. That is, as indicated by the lock state illustrated in FIG. 10, the workpiece 17 is strongly pressed against the seating face 23 via the hole 18. Further, a predetermined contacting gap is formed between the lower surface of the supporting member 21 and the upper end face of the valve member 78, and the valve face 81 of the valve member 78 is in contact with the valve seat 88.

In the lock state, the pressure of pressurized air for use in abnormality detection that has been supplied to the air supply passage 71 rises to the set value. This makes it possible to confirm that the clamp device is operating normally.

Figure 11:
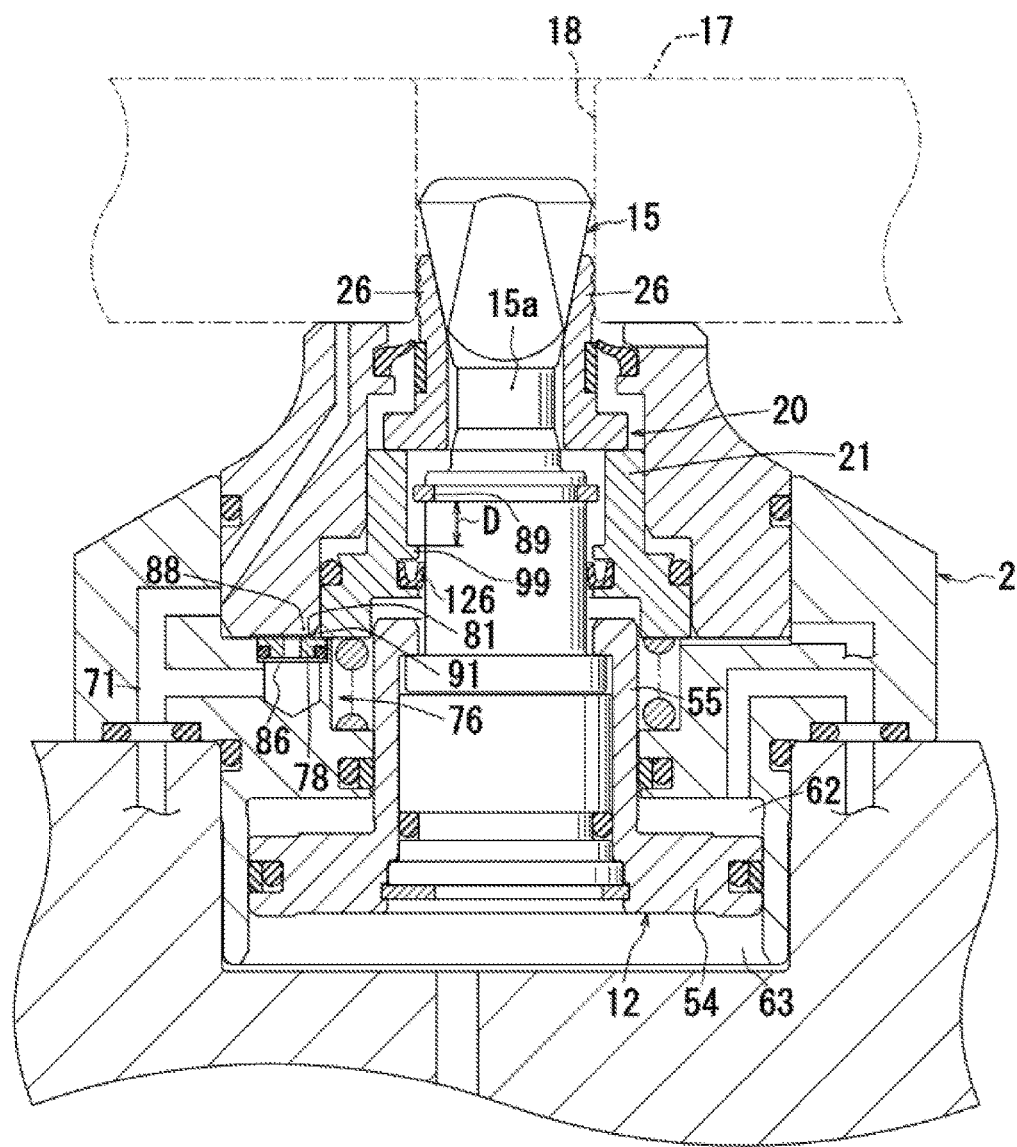
FIG. 11 illustrates a slipping state (malfunctioning state) of an engagement member provided in the clamp device.

At the time of a malfunction, the clamp device operates as follows:

In a case where, during downward movement of the clamping rod 15 for locking, the grip parts 26 of the engagement members 20 slip downward with respect to the inner circumferential surface of the hole 18 in the workpiece 17, the engagement members 20 and the supporting member 21 move downward in an integrated manner as illustrated in FIG. 11. This causes the lower end face of the supporting member 21 to push the valve member 78 open downward. Then, pressurized air for use in abnormality detection that has been supplied to the air supply passage 71 is discharged out of the housing 2 through the inlet 86 of the valve mechanism 76, an opening gap between the valve face 81 and the valve seat 88, the outlet 91, a space between a lip part of the inner sealing member 126 and an outer circumferential surface of the piston rod 55 in this order. For this reason, the pressure of the air supply passage 71 does not reach the set value, so a malfunction due to the slip is detected.

It should be noted that in the state of slip abnormality illustrated in FIG. 11, a predetermined actuation stroke D extending vertically is formed between the actuating portion 89 and the actuated portion 99.

Figure 12:
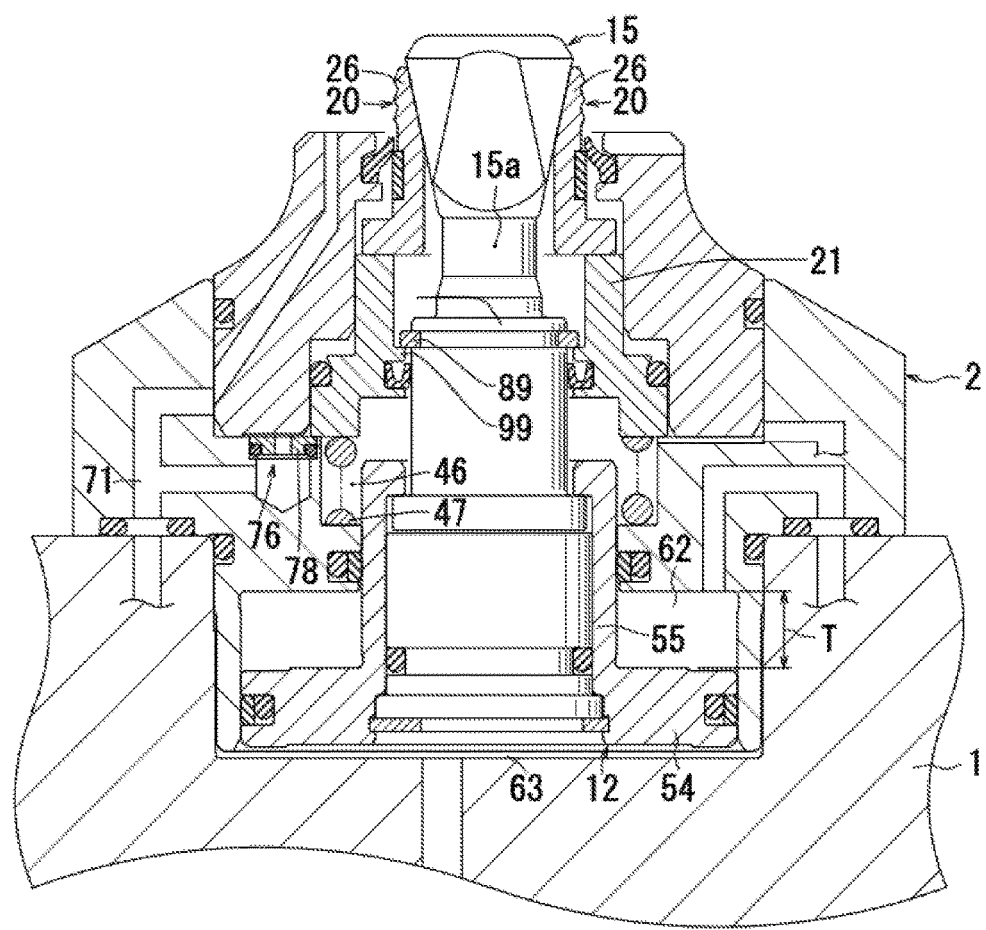
FIG. 12 illustrates an idle clamping state (malfunctioning state) of the clamp device.
Figure 13:
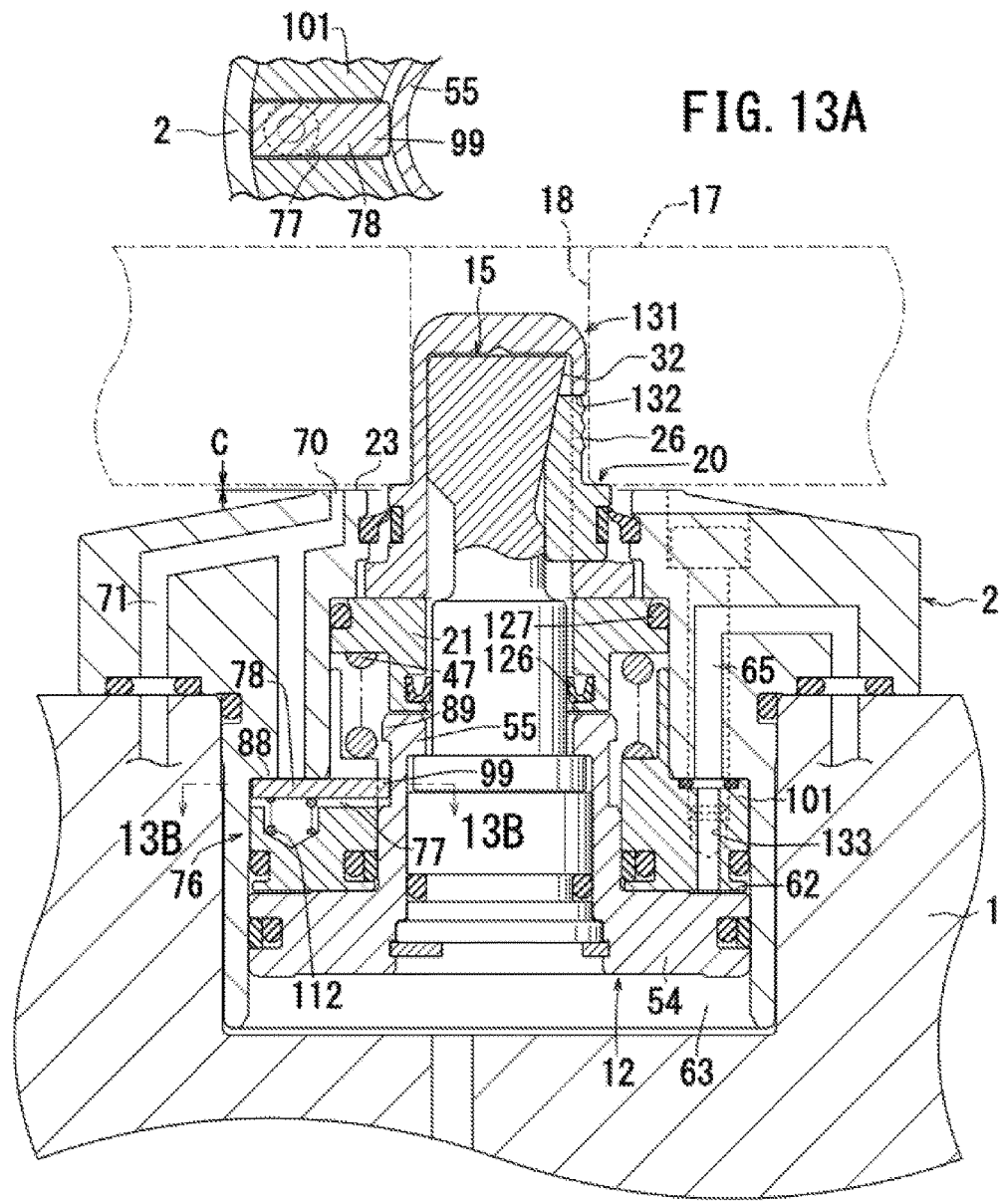
FIG. 13A illustrates a release state of a clamp device according to Embodiment 4 of the present invention.
FIG. 13B is a cross-sectional view taken along the line 13B-13B in FIG. 13A.

Further, in a case where the clamp device has been lock-driven in a state in which the workpiece 17 has yet to be carried in (i.e. in the case of idle clamping), the clamp device operates in the same manner as in Embodiment 1. That is, as illustrated in FIG. 12, the clamping rod 15 and the piston 12 move downward to the abnormal stroke region as a last-stage stroke region (lower-limit region) in a lock direction, leaving behind the engagement members 20 and the supporting member 21 at the raised position. Therefore, the actuating portion 89 of the clamping rod 15 causes the supporting member 21 via the actuated portion 99 to move downward, and the lower end surface of the supporting member 21 causes the valve member 78 to open.

Then, as in the slip abnormality state illustrated in FIG. 11, the pressure of the air supply passage 71 does not reach the set value. This makes it possible to detect that the clamp device is in an idle clamping state.

It should be noted that even in a case where a thin portion 15a formed on the lower side of the wedge face 32 at a certain height of the clamping rod 15 breaks due to metal fatigue or the like or where there is a defect in any of the thin-walled grip parts 26, the clamp device operates in the same manner as in the case of idle clamping, thus making possible to detect a malfunction.

FIGS. 13A and 13B illustrate Embodiment 4 of the present invention. FIG. 13A illustrates a release state of a clamp device. FIG. 13B is a cross-sectional view taken along the line 13B-13B in FIG. 13A.

Embodiment 4 differs from Embodiment 3 of FIGS. 9 through 12 in the following respect.

The housing 2 is not divided into upper and lower parts and is constituted in an integrated manner.

As illustrated in FIG. 13A (also see FIG. 15B, which is to be hereinafter described), a cylindrical cap member 131 is fitted on the upper part of the clamping rod 15. A plurality of horizontal holes 132 are bored through a circumferential wall of the cap member 131 circumferentially at predetermined intervals. The engagement members 20 are inserted in the horizontal holes 132, respectively, so as to be movable horizontally (radially). The engagement members 20 are moved radially outward by the wedge faces 32 (wedge parts) provided in the upper part of the clamping rod 15. The grip parts 26 are formed in the upper half parts of the engagement members 21, respectively.

An annular partition wall 101 is hermetically inserted in the cylinder hole 11 on an upper side of the piston body 54. The lock chamber 62 is formed between the partition wall 101 and the piston body 54. The lock chamber 62 communicates with the vertical passage 65 via a through-hole 133 in the partition wall 101. In an upper part of the partition wall 101, the valve chamber 77 of the valve mechanism 76 is formed in a rectangular form as seen in plan view. The rectangular valve member 78 is inserted in the valve chamber 77, and the valve member 78 is brought into contact with the valve seat 88 by the spring (elastic member) 112.

In a case where the clamp device has been lock-driven in a state in which the workpiece 17 has yet to be carried in (i.e. in the case of idle clamping), the clamp device operates in the same manner as in Embodiment 3 of FIG. 12. That is, the clamping rod 15 and the piston 12 move downward to the abnormal stroke region as a last-stage stroke region (lower-limit region) in a lock direction, leaving behind the engagement members 20, the cap member 131, and the supporting member 21 at the raised position. Therefore, the actuating portion 89 of the clamping rod 55 causes the valve member 78 via the actuated portion 99, provided in a radially inner end part of the valve member 78, to open. This prevents the pressure of the air supply passage 71 from reaching the set value, thus making it possible to detect that the clamp device is in an idle clamping state.

Figure 14:
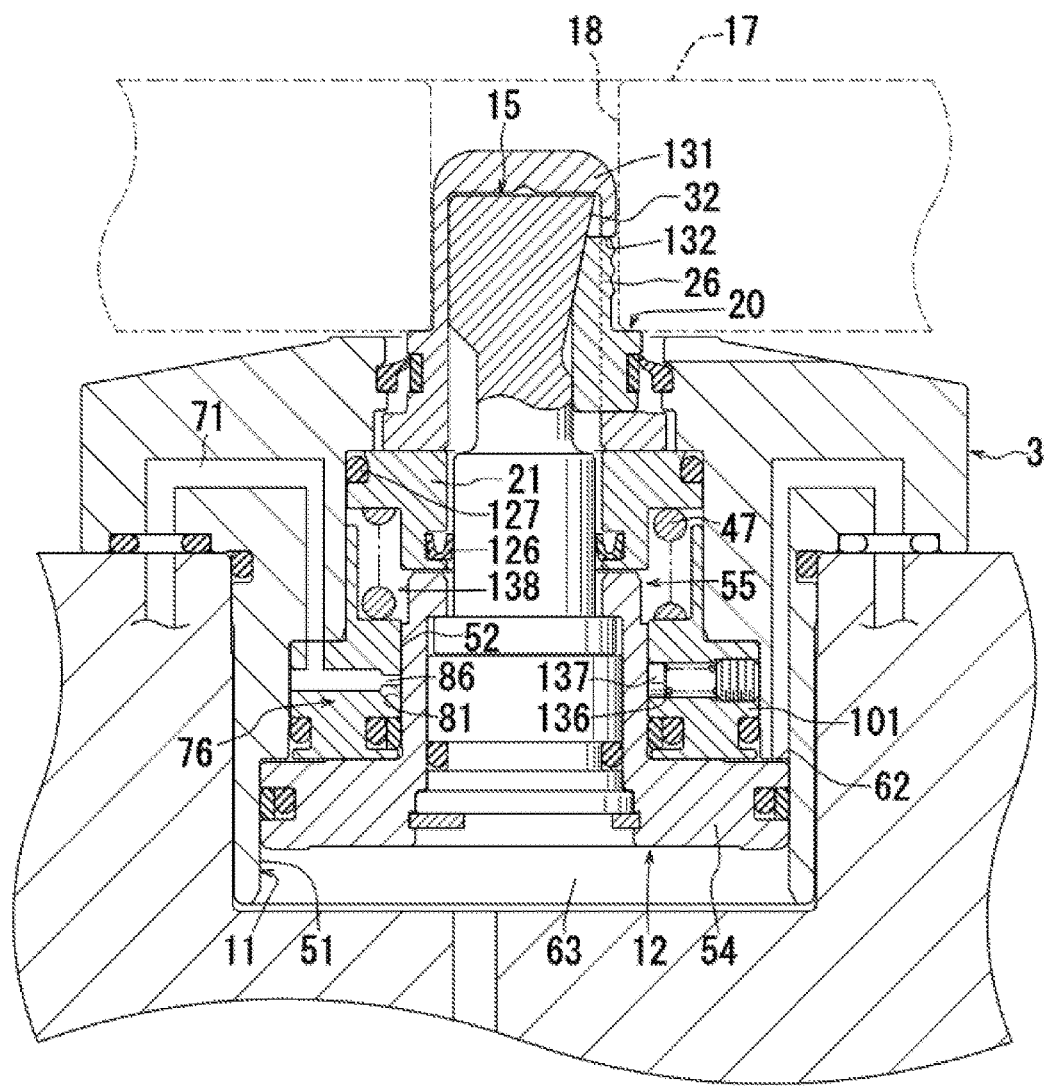
FIG. 14 illustrates a release state of a clamp device according to Embodiment 5 of the present invention.

FIG. 14 illustrates a release state of a clamp device according to Embodiment 5 of the present invention. Embodiment 5 of FIG. 14 differs from Embodiment 4 of FIGS. 13A and 13B in the following respect.

The inlet 86 of the valve mechanism 76 is bored in an inner circumferential surface of the partition wall 101 hermetically inserted in the cylinder hole 11. Further, a valve face 81 that opens and closes the inlet 86 is provided on the outer circumferential surface of the piston rod 55.

In the release state illustrated in FIG. 14, the valve face 81 surely closes the inlet 86 by biasing the piston rod 55 to the inlet 86 via a push spring 136 and a push plate 137.

During idle clamping, the clamp device works in the same manner as in Embodiment 3 of FIG. 12. That is, the clamping rod 15 and the piston 12 move downward to the abnormal stroke region as a last-stage stroke region (lower-limit region) in a lock direction, leaving behind the engagement members 20, the cap member 131, and the supporting member 21 at the raised position. Therefore, a circumferential groove 138 provided on an upper side of the valve face 81 of the piston rod 55 faces the input 86. This prevents the pressure of the pressurized air for use in detection that has been supplied to the air supply passage 71 from reaching the set value, thus making it possible to detect that the clamp device is in an idle clamping state.

FIGS. 15A through 18 illustrate Embodiment 6 of the present invention. FIG. 15A illustrates a release state of a clamp device. FIG. 15B is a cross-sectional view taken along the line 15B-15B in FIG. 15A.

Embodiment 6 is one obtained by modifying Embodiment 5 of FIG. 14 in the following manner.

As indicated by the release state illustrated in FIG. 15A, the passage 73 for use in air blow is bored upward to the spring chamber 46 of the supporting mechanism 49, and the opening is configured as the inlet 86 of the valve mechanism 76. Pressurized air for use in air blow is discharged out of the housing 2 from the passage 73 for use in air blow through the spring chamber 46, an oblique passage 141 in the supporting member 21, the cap member 131, and fitting gaps between the horizontal holes 132 and the engagement members 20, etc.

In the release state illustrated in FIG. 15A, the biasing force of the advancing spring 47 retains the cap member 131 and the engagement members 20 at the raised position via the supporting member 21, and the workpiece 17 is received by workpiece mounting surfaces 143 of the engagement members 20. For this reason, a predetermined seating gap C is formed between the seating face 23 at the upper end of the housing 4 and the lower surface of the workpiece 17.

Figure 16:
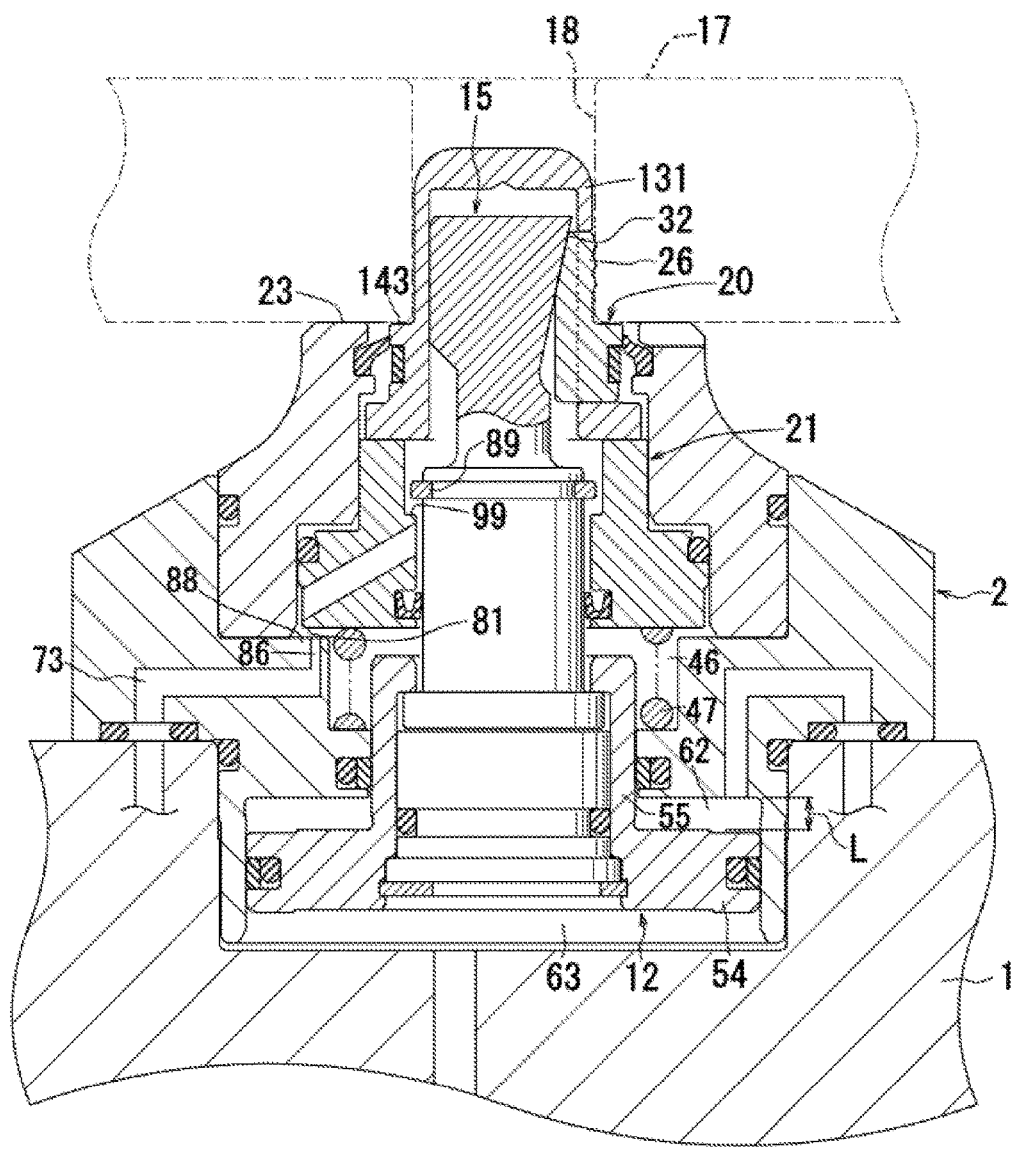
FIG. 16 illustrates a lock state of the clamp device.

For the clamp device to switch from the release state illustrated in FIG. 15A to the lock state illustrated in FIG. 16, the pressure oil is discharged out of the release chamber 63, and the pressure oil is supplied into the lock chamber 62. This causes the clamp device to operate in the same manner as in each of the embodiments described above. That is, as indicated by the lock state illustrated in FIG. 16, the wedge faces (wedge parts) 32 of the clamping rod 15 cause the grip parts of the engagement members 20 to be engaged on the inner circumferential surface of the hole 18 in the workpiece 17 and cause the engagement members 20, the cap member 131, and the supporting member 21 to move downward against the biasing force of the advancing spring 47. In the lock state illustrated in FIG. 16, the workpiece 17 is strongly pressed against the seating face 23 via the hole 18. Further, a predetermined opening gap is formed between the valve seat 88 provided on an outer circumference of the inlet 86 and the valve face 81 provided on the lower end face of the supporting member 21.

In the lock state illustrated in FIG. 16, the pressure of pressurized air for use in air blow that has been supplied to the passage 73 for use in air blow does not reach the set pressure. This makes it possible to confirm that the clamp device is operating normally.

Figure 17:
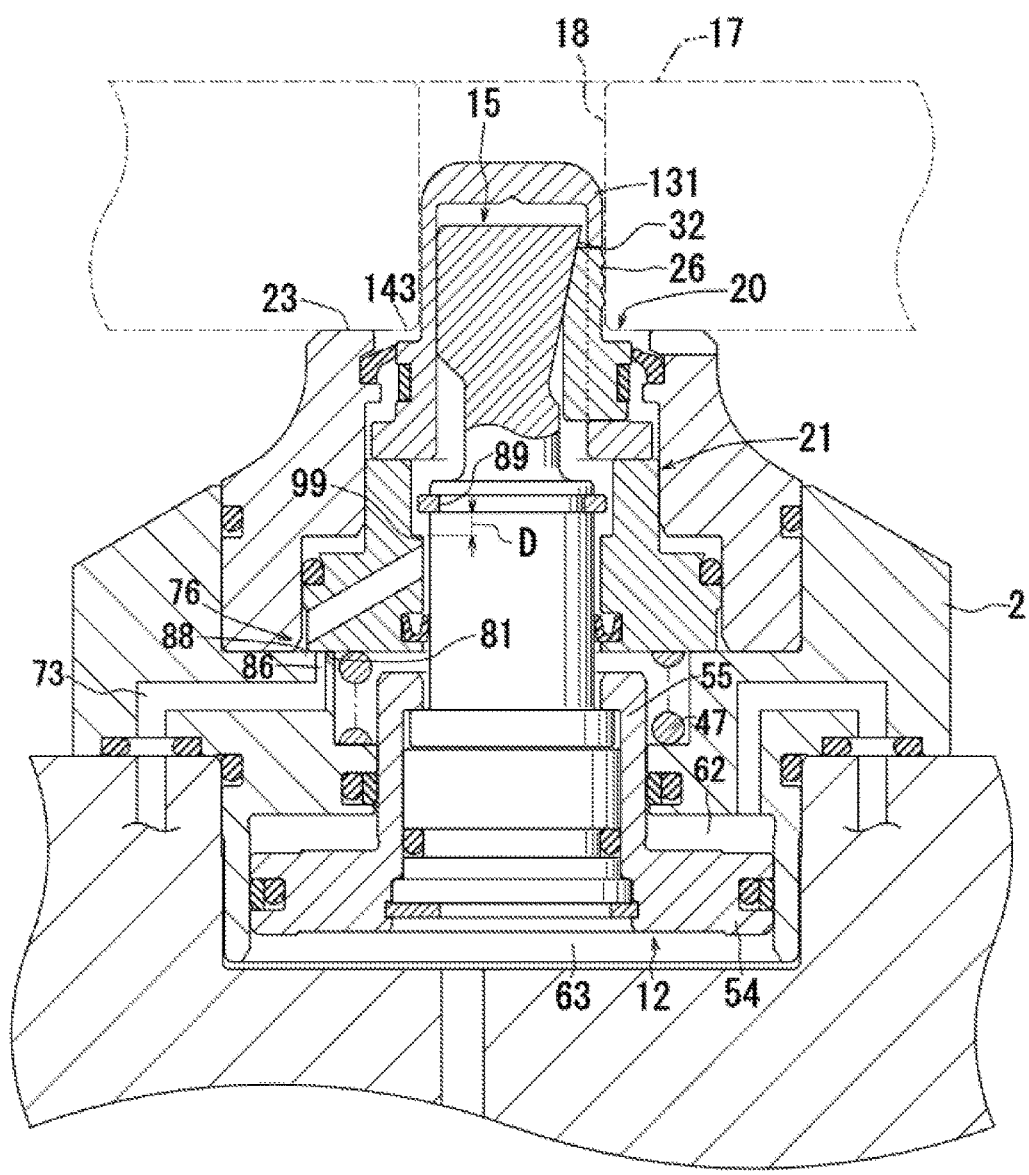
FIG. 17 illustrates a slipping state (malfunctioning state) of the clamp device.

At the time of a malfunction, the clamp device operates as follows:

In a case where, during downward movement of the clamping rod 15 for locking, the grip parts 26 of the engagement members 20 slip downward with respect to the inner circumferential surface of the hole 18 in the workpiece 17, the engagement members 20, the cap member 131, and the supporting member 21 move downward in an integrated manner as illustrated in FIG. 17. This causes the valve face 81 provided on the lower end face of the supporting member 21 to make contact with the valve seat 88. Therefore, the pressure of pressurized air supplied to the passage 73 for use in air blow rises to the set value, so a malfunction due to the slip is detected.

It should be noted that in the state of slip abnormality illustrated in FIG. 17, a predetermined actuation stroke D extending vertically is formed between the actuating portion 89 of the clamping rod 15 and the actuated portion 99 of the supporting member 21.

Figure 18:
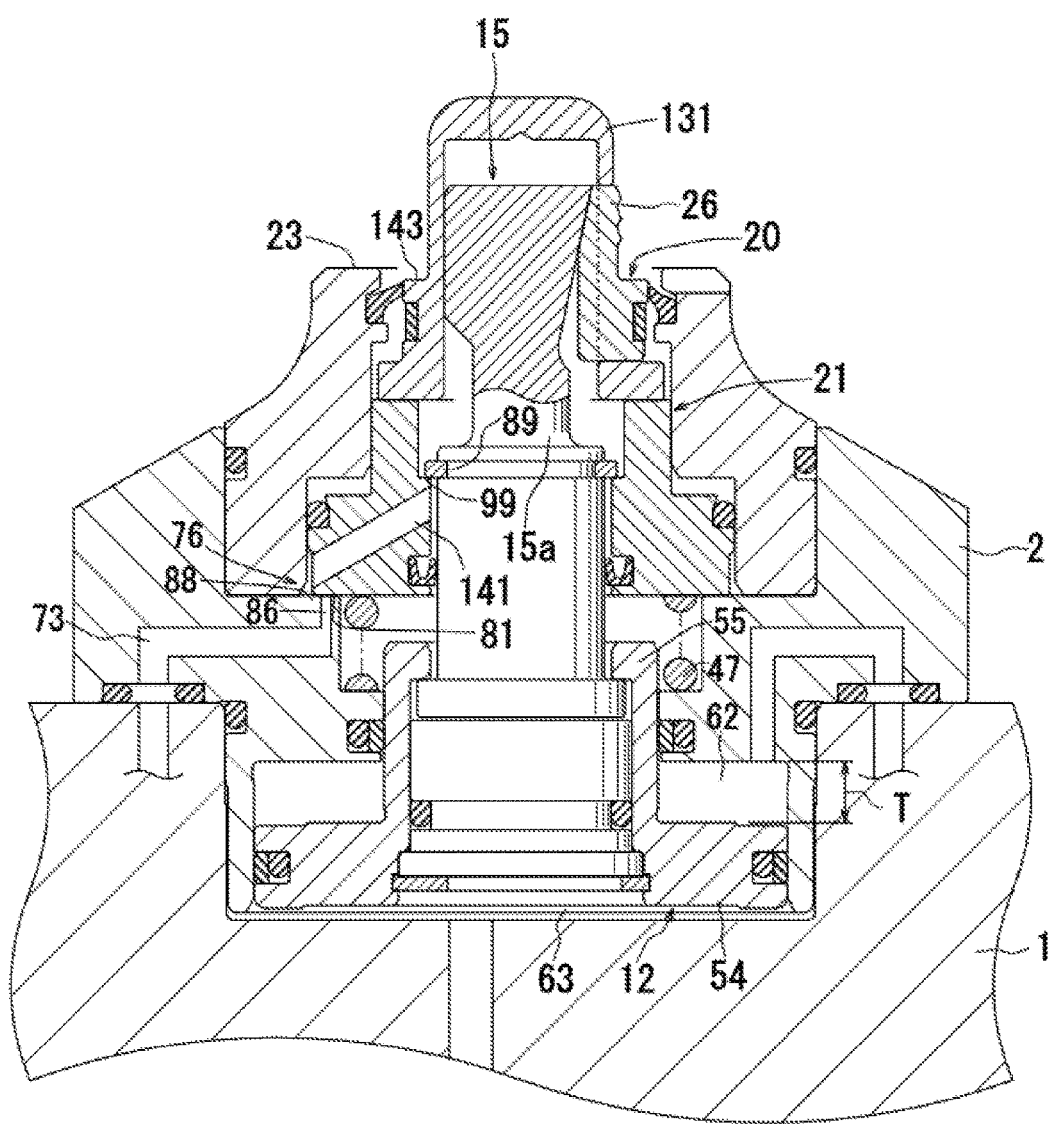
FIG. 18 illustrates an idle clamping state (malfunctioning state) of the clamp device.

During idle clamping of the clamp device, as illustrated in FIG. 18, the clamping rod 15 and the piston 12 move downward to the abnormal stroke region as a last-stage stroke region (lower-limit region) in a lock direction, so that the actuating portion 89 causes the supporting member 21 via the actuated portion 99 to move downward, and the valve face 81 provided on the lower end face of the supporting member 21 makes contact with the valve seat 88. Therefore, the pressure of the pressurized air supplied to the passage 73 for use in air blow rises to the set value. This makes it possible to detect that the clamp device is in an idle clamping state.

Further, even in a case where a thin portion 15a formed on the lower side of the wedge face 32 at a certain height of the clamping rod 15 breaks due to metal fatigue or the like or where there is a defect in any of the thin-walled grip parts 26, the clamp device operates in the same manner as in the case of idle clamping, so that a malfunction can be detected.

It should be noted that it is preferable that as in Embodiment 1, a seating detection hole 70 (see FIG. 1) be bored in the seating face 23 of the upper housing 4. The same applies to each of the embodiments described below.

Further, the structure in which, as indicated by the release state illustrated in FIG. 15A, the workpiece 17 is received by workpiece mounting surfaces 143 of the engagement members 20 or the like, whereby a predetermined seating gap C is formed, can used in any of the embodiments described above or in any of the embodiments described below.

Figure 19A:
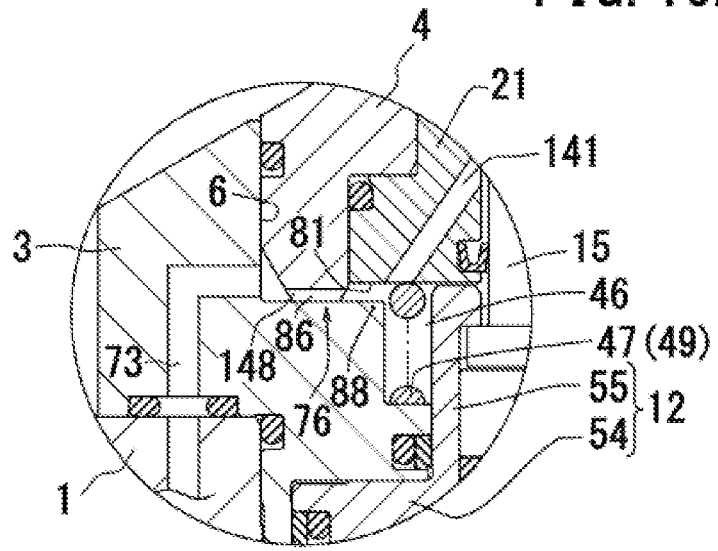
FIG. 19A is a partial view of a release state of a clamp device according to Embodiment 6 of the present invention.
Figure 19B:
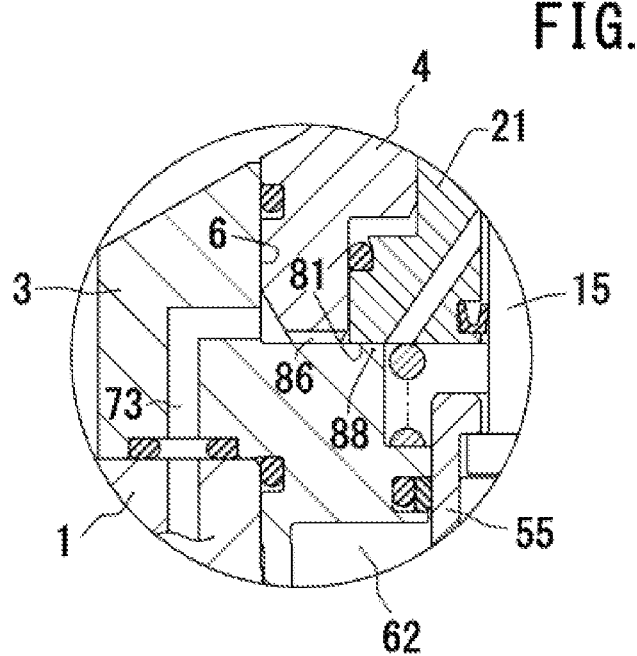
FIG. 19B is a partial view of an idle clamping state (malfunctioning state) of the clamp device of the modification.

FIGS. 19A and 19B illustrate a modification of Embodiment 6. FIG. 19A is a partial view of a release state of a clamp device. FIG. 19B is a partial view of an idle clamping state (malfunctioning state) of the clamp device.

As indicated by the release state illustration in FIG. 19A, the pressurized air supplied to the passage 73 for use in air blow is supplied to an oblique passage 141 in the supporting member 21 via a bottom corner part of the attachment hole 6 formed as a recess in the upper part of the lower housing 3, a communicating groove 148 provided in the lower part of the upper housing 4, and the spring chamber 46 of the supporting mechanism 49. A radially inner end part of the communicating groove 148 is configured as the inlet 86 of the valve mechanism 76. The valve seat 88 of the valve mechanism 76 is formed on a bottom surface of the attachment hole 6 radially toward the inside of the communicating groove 148.

In the release state illustrated in FIG. 19A, a predetermined opening gap is formed between the valve face 81 provided on the lower end face of the supporting member 21 and the valve seat 88.

During idle clamping illustrated in FIG. 19B, as in FIG. 18, the valve face 81 makes contact with the valve seat 88. Therefore, the pressure of pressurized air supplied to the passage 73 for use in air blow rises to the set value. This makes it possible to detect that the clamp device is in an idle clamping state.

Figure 20:
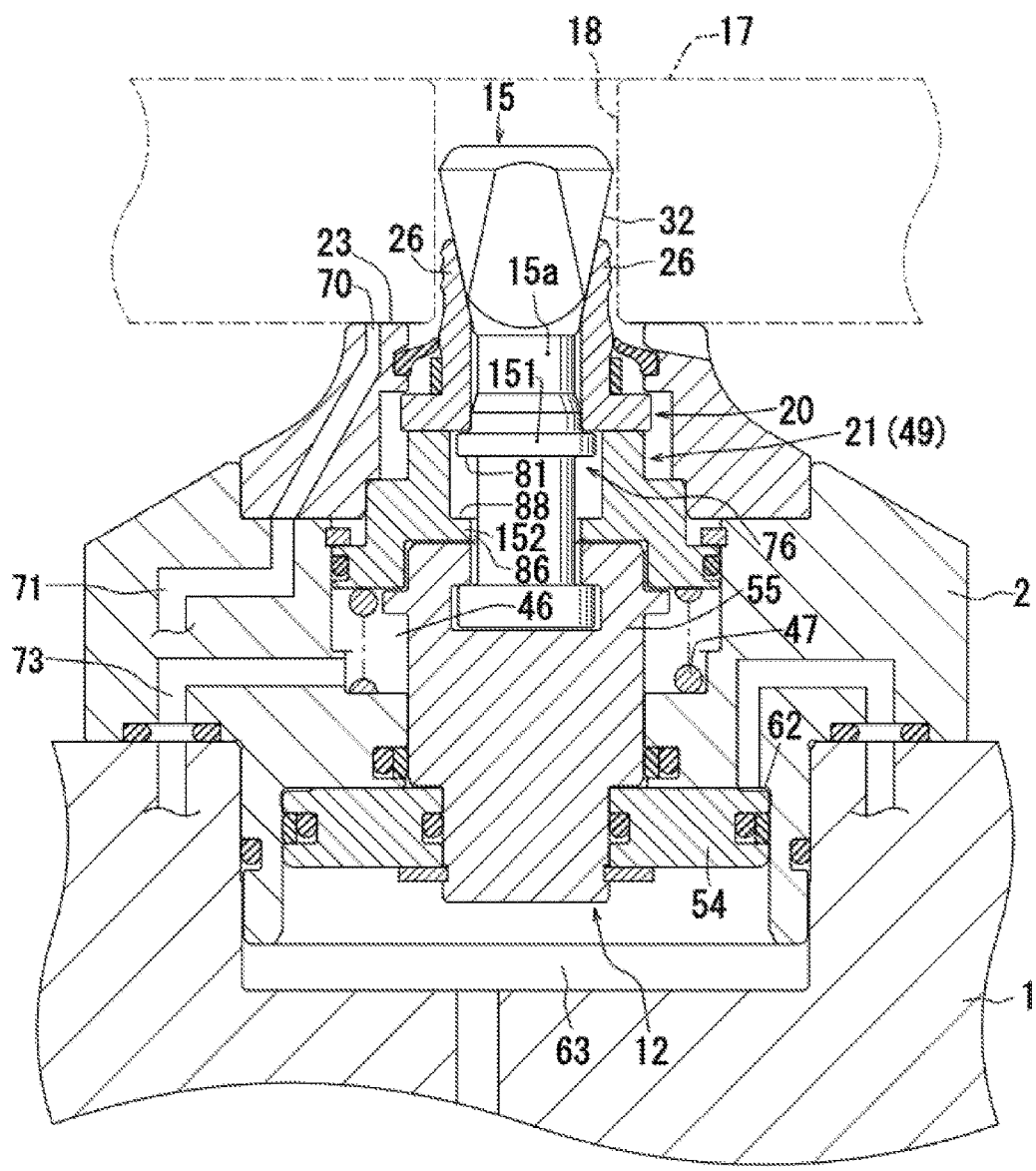
FIG. 20 illustrates a release state of a clamp device according to Embodiment 7 of the present invention.

FIG. 20 illustrates a release state of a clamp device according to Embodiment 7 of the present invention.

In Embodiment 7, too, the pressurized air supplied to the passage 73 for use in air blow is discharged out of the housing 2 via the spring chamber 46 of the supporting mechanism 49, a fitting gap between the cylindrical supporting member 21 and the piston rod 55, a gap between an upper end face a flange 151 provided at a certain height of the clamping rod 15 and a lower end face of each of the engagement members 20, and a gap between adjacent engagement members 20.

A lower part of the cylindrical hole in the supporting member 21 protrudes radially inward, and the valve seat 88 of the valve mechanism 76 is constituted by an upper face of the protruding part 152. Further, the valve face 81 is formed on a lower end face of the flange 151. Moreover, the inlet 86 of the valve mechanism 76 is constituted by a radially inner space of the protruding part 152.

During idle clamping of the clamp device, the clamping rod 15 and the piston 12 move backward to the last-stage stroke region (lower-limit region), leaving behind the engagement members 20 and the supporting member 21 retained at the raised position, so that the valve face 81 of the clamping rod 15 makes contact with the valve seat 88. This causes the pressure of the pressurized air supplied to the passage 73 for use in air blow to rise to the set value, thus making it possible to detect that the clamp device is in an idle clamping state.

It should be noted that this configuration may be replaced by a configuration in which the protruding part 152 is provided with a valve face 81 and the flange 151 is provided with a valve seat 88.

Each of the embodiments and modifications described above can be further altered as follows:

The number of engagement members 20 that are circumferentially provided may be two, three, or five, instead of being four. Further, the plurality of engagement members 20 may be replaced by a monolithic annular collet provided with slits.

The structure of coupling between the clamping rod 15 and the piston rod 55 can also be achieved by arranging them in parallel and coupling them to each other via a horizontal coupler, instead of coupling them coaxially.

The supporting mechanism 49 can also be achieved by utilizing fluid pressure such as hydraulic pressure or pneumatic pressure, instead of utilizing a biasing force of an elastic material such as a spring illustrated above.

Detection of a malfunction may be achieved by detecting the flow rate of pressurized air with a flow rate switch, instead of detecting the pressure of pressurized air with a pressure switch.

The mounting hole 1a in the base plate 1 may be omitted. In this case, the lower surface of the lower housing 3 is fixed to the upper surface of the base plate 1 via a sealing member (not shown).

The drive mechanism may be a pneumatic cylinder instead of being the hydraulic cylinder 10 illustrated above. The fluid pressure cylinder may be one which is lock-driven by a pressurized fluid and release-driven by a spring force or one which is lock-driven by a spring force and release-driven by a pressurized fluid, instead of being a double-acting cylinder illustrated above.

The clamp device placed upside down, transversely, or obliquely, instead of being placed upside up.

The object to be fixed to which the present invention is applied may be a work pallet or a die, instead of being the workpiece 17 illustrated above.

In addition, various alterations can of course be made within the range that a person skilled in the art can envisage.

In order to attain the aforementioned object, an outline of the present invention is to configure a clamp device as follows, as illustrated in FIGS. 1 through 3 or FIG. 7, FIGS. 9 through 12, FIGS. 13A and 13B, FIG. 14, FIGS. 15A through 18, and FIG. 20:

An engagement member 20, inserted in a hole 18 in an object to be fixed 17, which is capable of gripping an inner circumferential surface of the hole 18 is constituted by a plurality of engagement members circumferentially provided at predetermined intervals or a monolithic engagement member circumferentially provided in an annular shape. A wedge part 32 of a clamping rod 15 is engaged on an inner circumference of the engagement member 20 from a top end. A piston 12 that causes the clamping rod 15 to move axially has a piston rod 55 protruding toward the top end so as to be coupled to the clamping rod 15. The engagement member 20, the clamping rod 15, and the piston 12 are provided in a housing 2. A valve mechanism 76 that is actuated by the piston rod 55 or the clamping rod 15 is provided in the housing 2. The valve mechanism 76 is opened or closed when the piston 12 has moved to a last-stage stroke region in a lock direction of a total stroke T of the piston 12. The clamp device is configured so that pressurized air is able to be supplied to an inlet 86 of the valve mechanism 76.

It should be noted that in the foregoing configuration, a possible example of the pressurized air is pressurized air that is supplied exclusively for abnormality detection or cleaning pressurized air that is supplied for blowing a gap between adjacent ones of the plurality of engagement members or the like.

Thus configured, the present invention brings about the following function and effects:

In a case where the clamp device has been lock-driven in a state in which an object to be fixed such as a workpiece has yet to be carried in (or in which the object to be fixed has yet to be carried in a predetermined position) or in which an object to be fixed carried in has a hole inner diameter beyond the acceptable range (hereinafter referred to also as "idle clamping"), the engagement member is moved radially outward by the wedge part of the clamping rod; however, the engagement member is not received by the inner circumferential surface of the hole in the object to be fixed, and is therefore excessively expanded in diameter. In such an excessively expanded diameter state, the clamping rod and the piston move toward the base end, leaving behind the engagement member.

Moreover, when the piston has moved to an abnormal stroke region as a last-stage stroke region (lower-limit region) in a lock direction, the piston rod or the clamping rod causes the valve mechanism to be opened or closed.

Then, the pressure of the pressurized air supplied to the inlet of the valve mechanism becomes lower than the set pressure or rises to the set pressure (or the outlet flow rate of the pressurized air becomes larger than the set value or becomes smaller than the set value). This makes it possible to, by detecting the change in state, detect that the clamp device is malfunctioning.

Further, in a case where a portion of the clamping rod at a certain height breaks, for example, due to metal fatigue or the like in the lock state in which the object to be fixed is fixed by the clamp device, a lower half part of the broken clamping rod and the piston move downward, leaving behind the engagement member. Then, as in the case of idle clamping, when the piston moves downward to an abnormal stroke region as the last-stage stroke region (lower-limit region) in the lock direction, the piston rod or the clamping rod causes the valve mechanism to be opened or closed. This makes it possible to detect that the clamp device is malfunctioning.

Furthermore, lock driving of the clamp device without notice of such a defect in a grip part of the engagement member causes the engagement member to be excessively expanded in diameter without being received by the inner circumferential surface of the hole in the object to b fixed and to hardly exert gripping forces on the inner circumferential surface of the hole, and in such an abnormal gripped state, the clamping rod and the piston move downward, leaving behind the engagement members. Then, as in the case of idle clamping, when the piston moves downward to an abnormal stroke region as the last-stage stroke region (lower-limit region) in the lock direction, the piston rod or the clamping rod causes the valve mechanism to be opened or closed. This makes it possible to detect that the clamp device is malfunctioning.

Further, since the present invention is configured such that the piston rod protruding toward the top end so as to be coupled to the clamping rod or the clamping rod causes the valve mechanism to be opened or closed, it becomes possible to place the valve mechanism in a space on the outer circumference of the piston rod or the clamping rod, so that the clamp device can be made compact by effectively utilizing an extra space in the housing.

As illustrated in each of the drawings described above, for example, the present invention is preferably configured as follows:

A supporting mechanism 49 that pushes the engagement member 20 toward the top end with a predetermined force is provided. The supporting mechanism 49 is provided with a cylindrical supporting member 21 that moves axially together with the engagement member 20. The clamping rod 15 is inserted in a cylindrical hole in the supporting member 21.

In this case, during lock driving of the clamp device, the engagement member can be retained at a predetermined position toward the top end via the supporting member with a pushing force of the supporting mechanism, so that the wedge part of the clamping rod can surely lock-drive the engagement member.

As illustrated in FIGS. 1 through 3, or FIG. 7, or FIGS. 13A and 13b, for example, the present invention is preferably configured such that the piston rod 55 protruding toward the top end is provided with an actuating portion 89 that opens or closes the valve mechanism 76 when the piston 12 has moved to the last-stage stroke region.

In this case, a device for detecting a clamping abnormality can be simply configured; therefore, the clamp device can be made compact.

As illustrated in FIGS. 1 through 3, for example, the present invention is preferably configured as follows:

An annular space is formed between a cylinder hole 11 in the housing 2 and the piston rod 55, and a valve member 78 of the valve mechanism 76 is formed in a cylindrical shape. The cylindrical valve member 78 is hermetically inserted in the annular space so as to be movable axially. The inlet 86 of the valve mechanism 76 is bored in an annular end face 84 provided on a base end of a step part 83 of the cylinder hole 11, and the valve member 78 is configured to be able to face the inlet 86 from the base end. A valve face 81 is provided on an end face of the valve member 78 that faces the top end.

In this case, too, the valve mechanism can be simply configured; therefore, the clamp device can be made compact.

As illustrated in FIG. 5, for example, the present invention is preferably configured as follows:

An annular partition wall 101 is hermetically inserted between a cylinder hole 11 in the housing 2 and the piston rod 55. An annular space is formed between a cylindrical hole in the annular partition wall 101 and the piston rod 55, and a valve member 78 of the valve mechanism 76 is formed in a cylindrical shape. The cylindrical valve member 78 is inserted in the annular space so as to be movable axially. The inlet 86 of the valve mechanism 76 is bored in an annular end face 84 provided on a base end of a step part 83 of the cylinder hole 11, and the valve member 78 is configured to be able to face the inlet 86 from the base end. A valve face 81 is provided on an end face of the valve member 78 that faces the top end.

In this case, during lock driving of the clamp device, the partition wall can prevent the pressure of a pressurized fluid for locking from acting of the valve member. This allows the valve member to be smoothly opened or closed, thus making it possible to surely detect a malfunction in the clamp device.

As illustrated in FIG. 7 or 8, for example, the present invention is preferably configured as follows:

A valve chamber 77 of the valve mechanism 76 is formed in the housing 2 on an outer circumferential side of the piston rod 55 in parallel with the piston rod 55. The valve member 78 is swingably and hermetically inserted in the valve chamber 77. An elastic member 112 is provided which biases the valve member 78 in a valve-closing direction. The inlet 86 of the valve mechanism 76 is bored to the valve chamber 77, and the valve member 78 is provided with a valve face 81 facing the inlet 86. The valve member 78 has a protruding part protruding radially inward to the piston rod 55, the protruding part being provided with an actuated portion 99 facing the actuating portion 89 with a predetermined distance therebetween.

As illustrated in FIGS. 9 through 12 or FIGS. 15A through 18, for example, the present invention is preferably configured as follows:

The clamping rod 15 is provided with an actuating portion 89 that opens or closes the valve mechanism 76, and the supporting member 21 is provided with an actuated portion 99 with which the actuating portion 89 is able to make contact axially. The actuating portion 89 is configured to open or close the valve mechanism 76 via the actuated portion 99 when the piston 12 has moved to the last-stage stroke region.

As illustrated in FIGS. 9 through 12 or FIGS. 15A through 18, for example, the present invention is preferably configured as follows:

In a case where, during lock driving of the piston 12, the engagement member 20 slips with respect to the inner circumferential surface of the hole 18 in the object to be fixed 17, the piston 12 opens or closes the valve mechanism 76 via the wedge part 32 of the clamping rod 15, the engagement member 20, and the supporting member 21, and a predetermined actuation stroke D is configured to be provided between the actuating portion 89 and the actuated portion 99. Dimensions of the actuation stroke D are set to take on smaller values than dimensions of the last-stage stroke region, the actuating portion 89 opening or closing the valve mechanism 76 via the actuated portion 99 when the piston 12 has moved to the last-stage stroke region.

As illustrated in FIG. 14, for example, the present invention may be configured such that the inlet 86 of the valve mechanism 76 is bored in an inner circumferential surface of a cylinder hole 11 in the housing 2, and the piston rod 55 is provided with a valve face 81 that opens and closes the inlet 86.

As illustrated in FIG. 20, for example, the present invention may be configured such that: one of the supporting member 21 and the clamping rod 15 is provided with a valve seat 88 of the valve mechanism 76, and the other is provided with a valve face 81 of the valve mechanism 76; and the valve face 81 is configured to make contact with the valve seat 88 when the piston 12 has moved to the last-stage stroke region.

REFERENCE SIGNS LIST

2: Housing, 11: Cylinder hole, 12: Piston, 15: Clamping rod, 17: Object to be fixed (workpiece), 18: Hole, 20: Engagement member, 21: Supporting member, 32: Wedge part (wedge face), 49: Supporting mechanism, 54: Piston body, 55: Piston rod, 76: Valve mechanism, 77: Valve chamber, 78: Valve member, 81: Valve face, 83: Step part, 84: Annular end face, 86: Inlet, 88: Valve seat, 89: Actuating portion, 99: Actuated portion, 101: Partition wall, 112: Elastic member (spring), D: Actuation stroke, T: Total stroke of piston 12.

The invention claimed is:

1. A clamp device comprising:
an engagement member (20), inserted in a hole (18) in an object to be fixed (17), which is capable of gripping an inner circumferential surface of the hole (18), the engagement member (20) being constituted by a plurality of engagement members circumferentially provided at predetermined intervals or a monolithic engagement member circumferentially provided in an annular shape;
a clamping rod (15) having a wedge part (32) that is engaged on an inner circumference of the engagement member (20) from a top end;
a piston (12) that causes the clamping rod (15) to move axially, the piston (12) having a piston rod (55) protruding toward the top end so as to be coupled to the clamping rod (15); and
a housing (2) in which the engagement member (20), the clamping rod (15), and the piston (12) are provided,
the clamp device further comprising:
a supporting mechanism (49) that pushes the engagement member (20) toward the top end with a predetermined force, the supporting mechanism (49) having: a cylindrical supporting member (21) that moves axially together with the engagement member (20); a spring chamber (46) provided on a base end of the supporting member (21); and an advancing spring (47), provided in the spring chamber (46), that biases the supporting member (21) toward the top end,
a valve mechanism (76) provided in the housing (2) so as to be actuated by the piston rod (55) or the clamping rod (15), the valve mechanism (76) being opened or closed when the piston (12) has moved to a last-stage stroke region in a lock direction of a total stroke (T) of the piston (12),
the clamp device being configured so that pressurized air is able to be supplied to an inlet (86) of the valve mechanism (76),
an annular space being formed between a cylinder hole (11) in the housing (2) and the piston rod (55), a valve member (78) of the valve mechanism (76) being formed in a annular shape, the annular valve member (78) being hermetically inserted in the annular space so as to be movable axially,
a valve face (81) of the valve member (78) being configured such that an annular end face (84) provided on a base end of a step part (83) of the cylinder hole (11) is contactable for closure by the valve face (81) from the base end, and when the piston (12) has moved to the last-stage stroke region in the lock direction, the valve face (81) being separated by the piston rod (55) or the clamping rod (15) from the annular end face (84) toward the base end to form a gap through which the pressurized air supplied to the inlet (86) of the valve mechanism (76) is discharged toward an outlet (91).

2. A clamp device as set forth in claim 1, wherein:
the clamping rod (15) is inserted in a cylindrical hole in the supporting member (21).

3. A clamp device as set forth in claim 2, wherein the piston rod (55) protruding toward the top end is provided with an actuating portion (89) that opens the valve mechanism (76) when the piston (12) has moved to the last-stage stroke region.

4. A clamp device as set forth in claim 1, wherein the inlet (86) of the valve mechanism (76) is bored in the annular end face (84).

5. A clamp device comprising:
an engagement member (20), inserted in a hole (18) in an object to be fixed (17), which is capable of gripping an inner circumferential surface of the hole (18), the engagement member (20) being constituted by a plurality of engagement members circumferentially provided at predetermined intervals or a monolithic engagement member circumferentially provided in an annular shape;
a clamping rod (15) having a wedge part (32) that is engaged on an inner circumference of the engagement member (20) from a top end;
a piston (12) that causes the clamping rod (15) to move axially, the piston (12) having a piston rod (55) protruding toward the top end so as to be coupled to the clamping rod (15); and
a housing (2) in which the engagement member (20), the clamping rod (15), and the piston (12) are provided,
the clamp device further comprising:
a valve mechanism (76) provided in the housing (2) so as to be actuated by the piston rod (55) or the clamping rod (15), the valve mechanism (76) being opened or closed when the piston (12) has moved to a last-stage stroke region in a lock direction of a total stroke (T) of the piston (12),
the clamp device being configured so that pressurized air is able to be supplied to an inlet (86) of the valve mechanism (76),
an annular partition wall (101) being hermetically inserted between a cylinder hole (11) in the housing (2) and the piston rod (55) so that an annular space is formed between a cylindrical hole in the annular partition wall (101) and the piston rod (55), a valve member (78) of the valve mechanism (76) being formed in a cylindrical shape, the cylindrical valve member (78) being inserted in the annular space so as to be movable axially,
a valve face (81) of the valve member (78) being configured such that an annular end face (84) provided on a base end of a step part (83) of the cylinder hole (11) is contactable for closure by the valve face (81) from the base end, and when the piston (12) has moved to the last-stage stroke region in the lock direction, the valve face (81) being separated by the piston rod (55) or the clamping rod (15) from the annular end face (84) toward the base end to form a gap through which the pressurized air supplied to the inlet (86) of the valve mechanism (76) is discharged toward an outlet (91).

6. A clamp device comprising:
an engagement member (20), inserted in a hole (18) in an object to be fixed (17), which is capable of gripping an inner circumferential surface of the hole (18), the engagement member (20) being constituted by a plurality of engagement members circumferentially provided at predetermined intervals or a monolithic engagement member circumferentially provided in an annular shape;
a clamping rod (15) having a wedge part (32) that is engaged on an inner circumference of the engagement member (20) from a top end;
a piston (12) that causes the clamping rod (15) to move axially, the piston (12) having a piston rod (55) protruding toward the top end so as to be coupled to the clamping rod (15); and
a housing (2) in which the engagement member (20), the clamping rod (15), and the piston (12) are provided,
the clamp device further comprising:
a supporting mechanism (49) that pushes the engagement member (20) toward the top end with a predetermined force, the supporting mechanism (49) having: a cylindrical supporting member (21) that moves axially together with the engagement member (20); a spring chamber (46) provided on a base end of the supporting member (21); and an advancing spring (47), provided in the spring chamber (46), that biases the supporting member (21) toward the top end,
a valve mechanism (76) provided in the housing (2) so as to be actuated by the piston rod (55) or the clamping rod (15), the valve mechanism (76) being opened or closed when the piston (12) has moved to a last-stage stroke region in a lock direction of a total stroke (T) of the piston (12),
the clamp device being configured so that pressurized air is able to be supplied to an inlet (86) of the valve mechanism (76),
the piston rod (55) protruding toward the top end being provided with an actuating portion (89) that opens or closes the valve mechanism (76) when the piston (12) has moved to the last-stage stroke region,
a valve chamber (77) of the valve mechanism (76) being formed in the housing (2) on an outer circumferential side of the piston rod (55) in parallel with the piston rod (55), a valve member (78) being swingably and hermetically inserted in the valve chamber (77), an elastic member (112) being provided which biases the valve member (78) in a valve-closing direction;
the inlet (86) of the valve mechanism (76) being bored to the valve chamber (77), the valve member (78) being provided with a valve face (81) facing the inlet (86); and
the valve member (78) having a protruding part protruding radially inward to the piston rod (55), the protruding part being provided with an actuated portion (99) facing the actuating portion (89) of the piston rod with a predetermined distance therebetween.

7. A clamp device comprising:
an engagement member (20), inserted in a hole (18) in an object to be fixed (17), which is capable of gripping an inner circumferential surface of the hole (18), the engagement member (20) being constituted by a plurality of engagement members circumferentially provided at predetermined intervals or a monolithic engagement member circumferentially provided in an annular shape;
a clamping rod (15) having a wedge part (32) that is engaged on an inner circumference of the engagement member (20) from a top end;
a piston (12) that causes the clamping rod (15) to move axially, the piston (12) having a piston rod (55) protruding toward the top end so as to be coupled to the clamping rod (15); and
a housing (2) in which the engagement member (20), the clamping rod (15), and the piston (12) are provided,
the clamp device further comprising:
a supporting mechanism (49) that pushes the engagement member (20) toward the top end with a predetermined force, the supporting mechanism (49) having: a cylindrical supporting member (21) that moves axially together with the engagement member (20); a spring chamber (46) provided on a base end of the supporting member (21); and an advancing spring (47), provided in the spring chamber (46), that biases the supporting member (21) toward the top end, a valve mechanism (76) provided in the housing (2) so as to be actuated by the piston rod (55) or the clamping rod (15), the valve mechanism (76) being opened or closed when the piston (12) has moved to a last-stage stroke region in a lock direction of a total stroke (T) of the piston (12), the clamp device being configured so that pressurized air is able to be supplied to an inlet (86) of the valve mechanism (76), the clamping rod (15) being provided with an actuating portion (89) that opens or closes the valve mechanism (76), the supporting member (21) being provided with an actuated portion (99) with which the actuating portion (89) of the clamping rod is able to make contact axially; and the actuating portion (89) of the clamping rod being configured to open or close the valve mechanism (76) via the actuated portion (99) when the piston (12) has moved to the last-stage stroke region.

8. A clamp device as set forth in claim 7, wherein:

in a case where, during lock driving of the piston (12), the engagement member (20) slips with respect to the inner circumferential surface of the hole (18) in the object to be fixed (17), the piston (12) opens or closes the valve mechanism (76) via the wedge part (32) of the clamping rod (15), the engagement member (20), and the supporting member (21), and a predetermined actuation stroke (D) is configured to be provided between the actuating portion (89) of the clamping rod and the actuated portion (99); and dimensions of the actuation stroke (D) are set to take on smaller values than dimensions of the last-stage stroke region, the actuating portion (89) of the clamping rod opening or closing the valve mechanism (76) via the actuated portion (99) when the piston (12) has moved to the last-stage stroke region.

9. A clamp device comprising:

an engagement member (20), inserted in a hole (18) in an object to be fixed (17), which is capable of gripping an inner circumferential surface of the hole (18), the engagement member (20) being constituted by a plurality of engagement members circumferentially provided at predetermined intervals or a monolithic engagement member circumferentially provided in an annular shape;

a clamping rod (15) having a wedge part (32) that is engaged on an inner circumference of the engagement member (20) from a top end;

a piston (12) that causes the clamping rod (15) to move axially, the piston (12) having a piston rod (55) protruding toward the top end so as to be coupled to the clamping rod (15); and a housing (2) in which the engagement member (20), the clamping rod (15), and the piston (12) are provided, the clamp device further comprising:

a supporting mechanism (49) that pushes the engagement member (20) toward the top end with a predetermined force, the supporting mechanism (49) having: a cylindrical supporting member (21) that moves axially together with the engagement member (20); a spring chamber (46) provided on a base end of the supporting member (21); and an advancing spring (47), provided in the spring chamber (46), that biases the supporting member (21) toward the top end, a valve mechanism (76) provided in the housing (2) so as to be actuated by the piston rod (55) or the clamping rod (15), the valve mechanism (76) being opened or closed when the piston (12) has moved to a last-stage stroke region in a lock direction of a total stroke (T) of the piston (12), the clamp device being configured so that pressurized air is able to be supplied to an inlet (86) of the valve mechanism (76), the inlet (86) of the valve mechanism (76) being bored in an inner circumferential surface of a cylinder hole (11) in the housing (2), the piston rod (55) being provided with a valve face (81) that opens and closes the inlet (86).

10. A clamp device comprising: an engagement member (20), inserted in a hole (18) in an object to be fixed (17), which is capable of gripping an inner circumferential surface of the hole (18), the engagement member (20) being constituted by a plurality of engagement members circumferentially provided at predetermined intervals or a monolithic engagement member circumferentially provided in an annular shape; a clamping rod (15) having a wedge part (32) that is engaged on an inner circumference of the engagement member (20) from a top end; a piston (12) that causes the clamping rod (15) to move axially, the piston (12) having a piston rod (55) protruding toward the top end so as to be coupled to the clamping rod (15); and a housing (2) in which the engagement member (20), the clamping rod (15), and the piston (12) are provided, the clamp device further comprising: a supporting mechanism (49) that pushes the engagement member (20) toward the top end with a predetermined force, the supporting mechanism (49) having: a cylindrical supporting member (21) that moves axially together with the engagement member (20): a spring chamber (46) provided on a base end of the supporting member (21): and an advancing spring (47), provided in the spring chamber (46), that biases the supporting member (21) toward the top end, a valve mechanism (76) provided in the housing (2) so as to be actuated by the piston rod (55) or the clamping rod (15), the valve mechanism (76) being opened or closed when the piston (12) has moved to a last-stage stroke region in a lock direction of a total stroke (T) of the piston (12), the clamp device being configured so that pressurized air is able to be supplied to an inlet (86) of the valve mechanism (76), the clamping rod (15) being inserted in a cylindrical hole in the supporting member (21), one of the supporting member (21) and the clamping rod (15) being providing with a valve seat (88) of the valve mechanism (76), and the other being provided with a valve face (81) of the valve mechanism (76), the valve face (81) being configured to make contact with the valve seat (88) when the piston (12) has moved to the last-stage stroke region.

11. A clamp device comprising:

an engagement member (20), inserted in a hole (18) in an object to be fixed (17), which is capable of gripping an inner circumferential surface of the hole (18), the engagement member (20) being constituted by a plurality of engagement members circumferentially provided at predetermined intervals or a monolithic engagement member circumferentially provided in an annular shape;

a clamping rod (15) having a wedge part (32) that is engaged on an inner circumference of the engagement member (20) from a top end;

a piston (12) that causes the clamping rod (15) to move axially, the piston (12) having a piston rod (55) protruding toward the top end so as to be coupled to the clamping rod (15); and a housing (2) in which the engagement member (20), the clamping rod (15), and the piston (12) are provided, the clamp device further comprising:

a valve mechanism (76) provided in the housing (2) so as to be actuated by the piston rod (55) or the clamping rod (15), the valve mechanism (76) being opened or closed when the piston (12) has moved to a last-stage stroke region in a lock direction of a total stroke (T) of the piston (12), the clamp device being configured so that pressurized air is able to be supplied to an inlet (86) of the valve mechanism (76), the clamp device further comprising a supporting mechanism (49) that pushes the engagement member (20) toward the top end with a predetermined force, the supporting mechanism (49) having a cylindrical supporting member (21) that moves axially together with the engagement member (20), the clamping rod (15) being inserted in a cylindrical hole in the supporting member (21), the housing (2) being formed with a rod hole (3a) in which the piston rod (55) is inserted;

a through-hole (107) facing the supporting member (21) and the valve mechanism (76) being axially formed in a circumferential wall of the rod hole (3a), an actuating pin (108) being inserted in the through-hole (107), in a case where, during lock driving of the piston (12), the engagement member (20) slips with respect to the inner circumferential surface of the hole (18) in the object to be fixed (17), the actuating pin (108) opening the valve mechanism (76) as the engagement member (20) and the supporting member (21) move toward the base end.

* * * * *